(12) United States Patent
Furusawa et al.

(10) Patent No.: US 8,186,453 B2
(45) Date of Patent: May 29, 2012

(54) POWER TOOL

(75) Inventors: Masanori Furusawa, Anjo (JP);
Yoshihiro Kasuya, Anjo (JP); Hajime Takeuchi, Anjo (JP)

(73) Assignee: Makita Corporation, Anjo-shi (JP)

( * ) Notice: Subject to any disclaimer, the term of this patent is extended or adjusted under 35 U.S.C. 154(b) by 0 days.

(21) Appl. No.: 12/654,112

(22) Filed: Dec. 10, 2009

(65) Prior Publication Data

US 2010/0155095 A1 Jun. 24, 2010

(30) Foreign Application Priority Data

Dec. 19, 2008 (JP) ................................. 2008-324772
Oct. 6, 2009 (JP) ................................. 2009-232753

(51) Int. Cl.
*B25D 17/14* (2006.01)
(52) U.S. Cl. ........................................ 173/197; 173/75
(58) Field of Classification Search ............... 173/75–79, 173/198, 199; 30/133
See application file for complete search history.

(56) References Cited

U.S. PATENT DOCUMENTS

| | | | | | |
|---|---|---|---|---|---|
| 2,122,517 | A | * | 7/1938 | Curtis | 175/135 |
| 2,250,670 | A | * | 7/1941 | Joy | 175/173 |
| 3,511,322 | A | * | 5/1970 | Holman et al. | 173/75 |
| 3,735,824 | A | | 5/1973 | Aström | |
| 4,547,928 | A | * | 10/1985 | Ludscheidt | 15/364 |
| RE32,415 | E | * | 5/1987 | Grech | 464/109 |
| 4,899,442 | A | * | 2/1990 | Horii et al. | 30/133 |
| 5,113,951 | A | * | 5/1992 | Houben et al. | 173/75 |
| 7,281,886 | B2 | * | 10/2007 | Stoerig | 408/67 |
| 7,740,086 | B2 | * | 6/2010 | Bleicher et al. | 173/198 |
| 2002/0062967 | A1 | * | 5/2002 | Ziegler | 173/216 |
| 2004/0172833 | A1 | * | 9/2004 | Tam et al. | 30/124 |
| 2006/0237207 | A1 | * | 10/2006 | Britz et al. | 173/217 |

FOREIGN PATENT DOCUMENTS

| | | |
|---|---|---|
| DE | 36 34 149 A1 | 5/1987 |
| DE | 43 42 484 A1 | 4/1995 |
| FR | 1 370 412 A | 8/1964 |
| JP | A 10-217065 | 8/1998 |

OTHER PUBLICATIONS

European Search Report issued in European Patent Application No. 09 01 5507, dated Apr. 28, 2010.

* cited by examiner

*Primary Examiner* — Rinaldi Rada
*Assistant Examiner* — Eyamindae Jallow
(74) *Attorney, Agent, or Firm* — Oliff & Berridge, PLC

(57) ABSTRACT

It is an object of the invention to provide an effective technique for reducing adverse effect of a dust suction device on the operability of a power tool, in the power tool which can suck dust generated during operation. The power tool has a motor 111 and a tool body 103 that houses the motor 111. A tool bit 119 is coupled to a tip end region of the tool body and driven by the motor 111 to perform a predetermined operation. The power tool further includes a dust suction part 151 through which dust generated during operation by the tool bit 119 is sucked and which covers at least a tip end of the tool bit 119, a dust transfer passage 153 through which the dust sucked into the dust suction part 151 is transferred and which is partly disposed within the tool body 103, and a dust discharge port 174 through which the dust transferred through the dust transfer passage 153 is discharged to the outside. Further, the dust discharge port 174 is disposed on the opposite side of the motor 111 from the tool bit 119.

15 Claims, 18 Drawing Sheets

POWER TOOL

BACKGROUND OF THE INVENTION

1. Field of the Invention

The invention relates to a dust collecting technique for power tools.

2. Description of the Related Art

Japanese laid-open patent publication No. 10-217065 discloses power tool with a dust suction device in which a suction path is provided by forming a hollow tool bit. Dust generated during operation is sucked by a suction fan from the suction path into a suction chamber through a suction passage formed within the tool body and then, collected in a collecting container connected to the suction chamber.

In such a power tool, however, provision of the dust suction device may impair operability of the power tool when a user holds a handle and performs an operation.

SUMMARY OF THE INVENTION

Accordingly, it is an object of the invention to provide a more effective dust collection in a power tool.

Above described object can be achieved by the claimed invention. According to an aspect of the invention, the representative power tool has a motor and a tool body that houses the motor. A tool bit can be coupled to a tip end region of the tool body and driven by the motor to perform a predetermined operation. The "power tool" according to the invention may preferably be represented by an impact tool such as an electric hammer or hammer drill, but it may also be represented by other power tools which generate dust during operation.

The power tool according to the invention further includes a dust suction part, a dust transfer passage and a dust discharge port. Dust generated during operation by the tool bit is sucked through the dust suction part. The dust suction part covers at least a tip end of the tool bit. Dust sucked into the dust suction part is transferred through the dust transfer passage. The dust transfer passage is disposed within the tool body. Dust transferred through the dust transfer passage is discharged to the outside through the dust discharge port. The dust discharge port is disposed on the opposite side of the motor from the tool bit. The "dust discharge port" according to the invention is preferably used in connection with a dust collecting hose of a dust collector. When the dust collector is driven, dust generated during operation is sucked through the dust suction part, then led through the dust transfer passage and discharged out into the dust collecting hose through the dust discharge port.

As one aspect of the invention, while a handle may be provided for the user to operate the power tool and connected to the tool body, the dust discharge port may be placed near the handle. By such construction, interference with operation and impairing of the operability can be alleviated.

According to a further aspect of the invention, the motor may be disposed such that an extension of a rotational axis of the motor runs in a direction transverse to the axial direction of the tool bit. In a horizontal position of the tool body in which the axial direction of the hammer bit coincides with a horizontal direction, the dust transfer passage may extend in a direction transverse to an axial direction of an output shaft of the motor above the output shaft within the tool body. In a power tool such as an impact tool in which a motor is disposed such that a rotational axis of the motor extends in a direction transverse to the axial direction of the tool bit, an actuating mechanism for converting the rotating output of the motor into linear motion and driving the tool bit is disposed above the rotating shaft of the motor. In such an arrangement, a free space can be structurally easily secured between the actuating mechanism and an upper end of the output shaft of the motor. Therefore, the dust transfer passage can be disposed by utilizing the free space within the power tool.

According to a further aspect of the invention, the representative power tool may further include a handle having a grip part which is designed to be held by a user and extends in a direction transverse to the axial direction of the tool bit. Further, both ends of the handle in the extending direction of the grip part are connected to the tool body, and the dust discharge port is formed in one of the connections of the handle to the tool body which is remote from the axis of the tool bit. The "handle" of which both ends in the extending direction of the grip part are connected to the tool body here represents a loop-shaped handle (D-shaped handle). Further, the "dust discharge port" is preferably open in a direction parallel to the extending direction of the grip part (downward).

With the construction in which the dust discharge port is formed in one of the connections of the handle to the tool body which is remote from the axis of the tool bit as described above, in a normal operating state in which the user holds the handle with this connection down, the dust collecting hose can be connected to the dust discharge port such that it is located on the side of the little finger of the hand holding the handle and runs downward. Therefore, the dust collecting hose is avoided from interfering with the operation of the handle and the operability is improved.

According to a further aspect of the invention, the representative power tool may further include an electric cord that supplies power to the motor, and the dust discharge port may be disposed adjacent to the electric cord. With the construction in which the dust discharge port is adjacent to the electric cord, when collecting dust by connecting, for example, a dust collecting hose of a dust collector to the dust discharge port, the dust collecting hose and the electric cord can be moved like one piece with respect to each other. Thus, the operability in operating the power tool is improved.

According to a further aspect of the invention, the dust suction part may entirely cover the tool bit and may have a cap-like shape having an open end formed as a dust suction port on the tool bit side. On the side opposite to the dust suction port, the dust suction part may have a connecting passage through which the dust sucked into a space between the dust suction part and the tool bit through the dust suction port is transferred to the dust transfer passage. Dust generated during operation on a workpiece is sucked into the dust suction part through an opening in the form of the dust suction port and then, the dust can be transferred to the dust transfer passage through the connecting passage.

According to a further aspect of the invention, the power tool may further include a side handle extending in a direction transverse to the axial direction of the tool bit, and the dust suction part may be mounted to the tool body with the side handle mounted to the tip end region of the tool body. The side handle typically has a rod-like shape, but it may have other shapes. In a power tool having a side handle, the side handle is normally disposed in a tip end region of the power tool. The dust suction part to be provided for sucking dust is functionally placed in the tip end region of the tool body. According to this aspect, the dust suction part can be mounted to the tip end region of the tool body with the side handle mounted to this tip end region. Therefore, the dust suction part can be rationally applied to the power tool having a side handle.

According to a further aspect of the invention, replacement of the tool bit can be made with the dust suction part mounted to the tip end region of tool body. With such a construction, for each replacement of the tool bit, it is not necessary to take the trouble of detaching the dust suction part from the tool body. Therefore, replacement of the tool bit can be efficiently performed.

According to a further aspect of the invention, the dust suction part may include a movable region that can expand and contract and is formed by a tubular bellows in a region which covers the tool bit, and a fixed region which is mounted to the tip end region of the tool body. Further, the movable region is removable from the fixed region so that replacement of the movable region can be made. According to this aspect, replacement of only the movable region which is formed by the bellows and susceptible to damage because of being movable, or partial replacement can be allowed. Such a construction is effective in reducing the cost of repair.

According to a further aspect of the invention, openings may be formed in the dust transfer passage and may provide a communication between the dust transfer passage and an internal space of the tool body. According to this aspect, when the dust collector is driven, dust generated during operation is sucked by the dust suction part, then led through the dust transfer passage and discharged out into the dust collecting hose through the dust discharge port. In this case, air flow into the dust transfer passage through the openings is generated within the internal space of the tool body. Therefore, heat within the internal space of the tool body can be allowed to escape to the outside through the dust transfer passage, so that the tool body can be cooled. Further, in a power tool, dust generated during operation may enter a tool body, stick to a carbon brush of the motor and exert an adverse effect on the sliding movement of the carbon brush on a commutator. Therefore, according to this embodiment, dust which enters the internal space is sucked together with air into the dust transfer passage through the openings. Thus, the amount of entry of dust toward the carbon brush can be reduced, so that the carbon brush can be protected against the adverse effect of dust.

According to a further aspect of the invention, the power tool may further include a driving mechanism that is driven by the motor and causes the tool bit to perform at least linear movement in the axial direction. Further, the tool body may have an inner housing that houses the driving mechanism and an outer housing that covers the inner housing, and the dust transfer passage may be disposed in an internal space between the inner housing and the outer housing. According to this aspect, air within the internal space between the inner housing and the outer housing can be sucked through the dust transfer passage and discharged to the outside.

According to a further aspect of the invention, the tool body may be formed by a plurality of tool body components. The dust transfer passage may have a correspondingly configured split structure, so that a single transfer passage is formed when the tool body components are assembled into the tool body. According to this aspect, the dust transfer passage can be formed by assembling the tool body components, so that it is not necessary to take the trouble of mounting the dust transfer passage. Thus, ease of mounting the dust transfer passage can be improved. Further, when the dust transfer passage is clogged with dust, in the dust transfer passage having a split structure, clog can be easily removed.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

(First Representative Embodiment)

Figure 1:
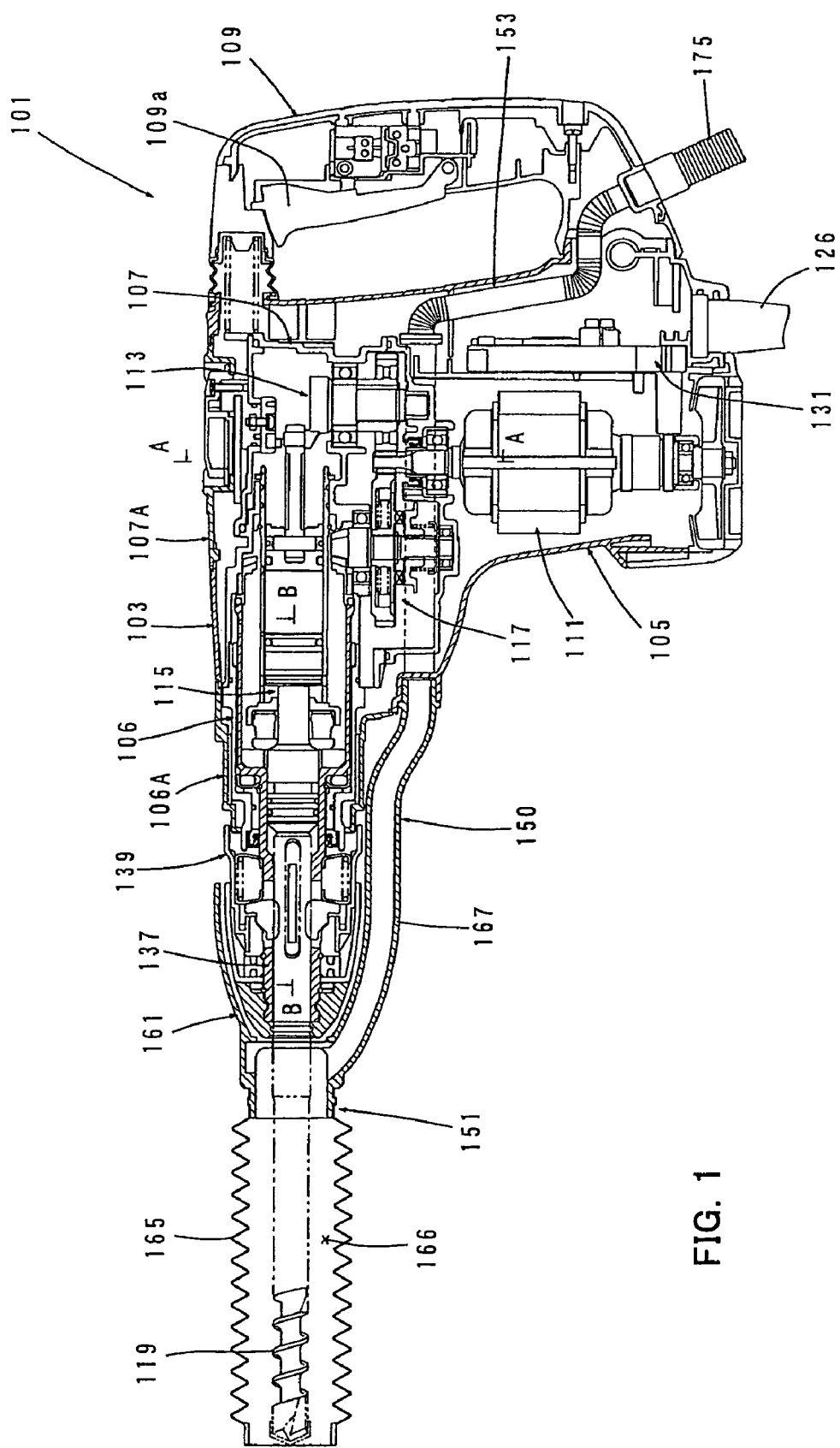
FIG. 1 is a sectional side view showing an entire structure of an electric hammer drill according to a first embodiment of the invention.
Figure 2:
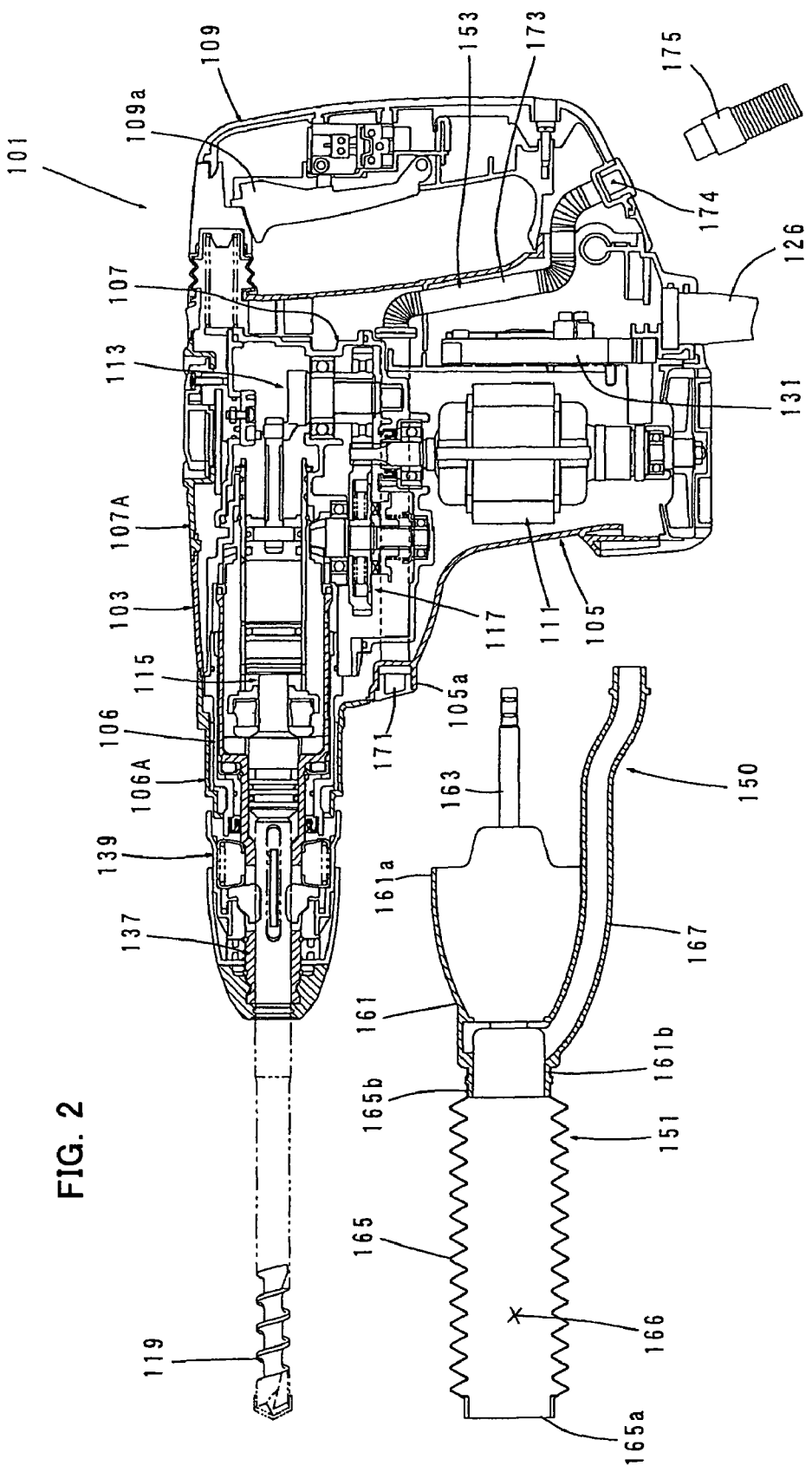
FIG. 2 is also a sectional side view showing the entire structure of the hammer drill, in the state in which a dust suction unit is not yet attached to the hammer drill.
Figure 3:
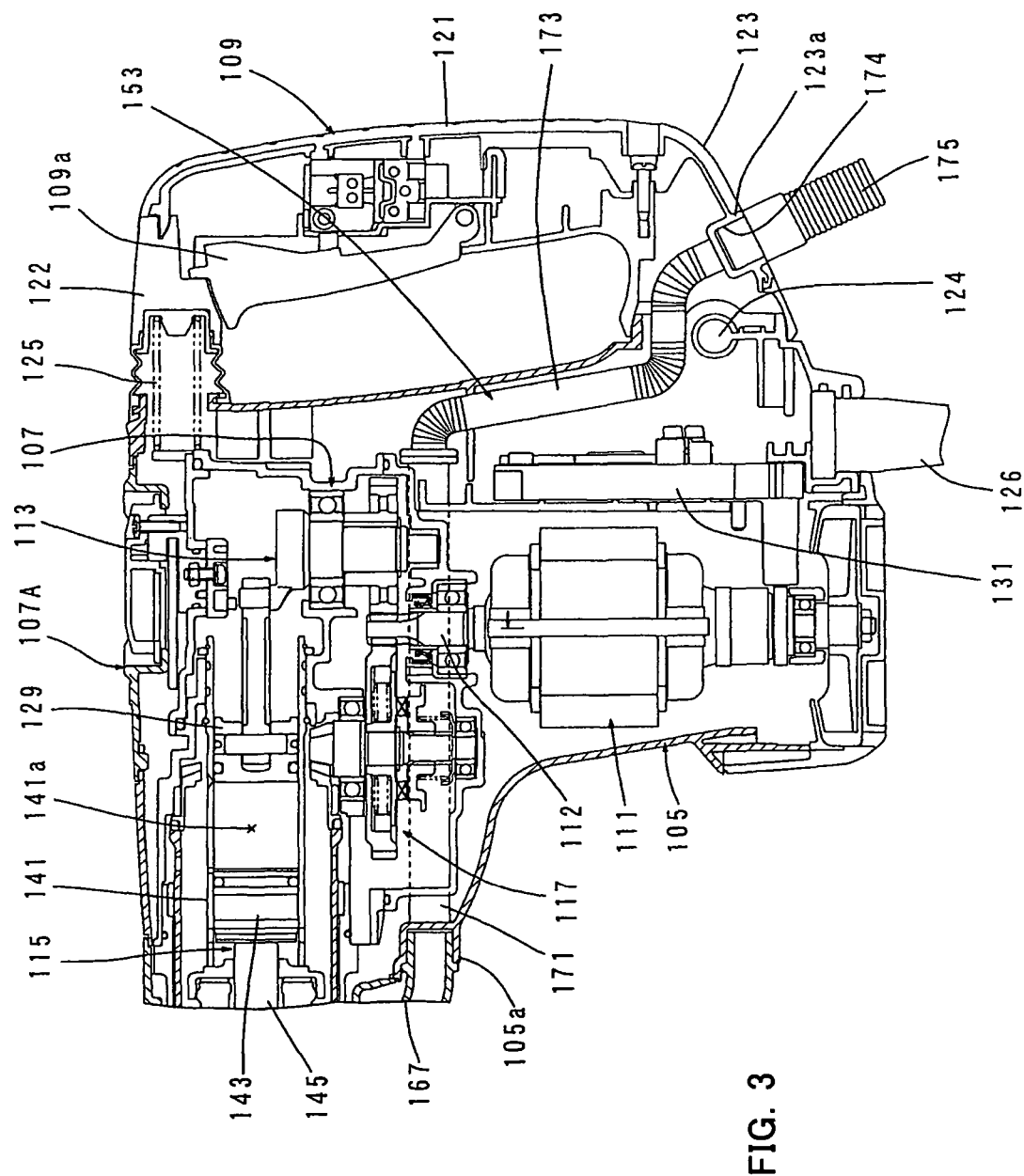
FIG. 3 is a partially enlarged sectional view of FIG. 1.
Figure 4:
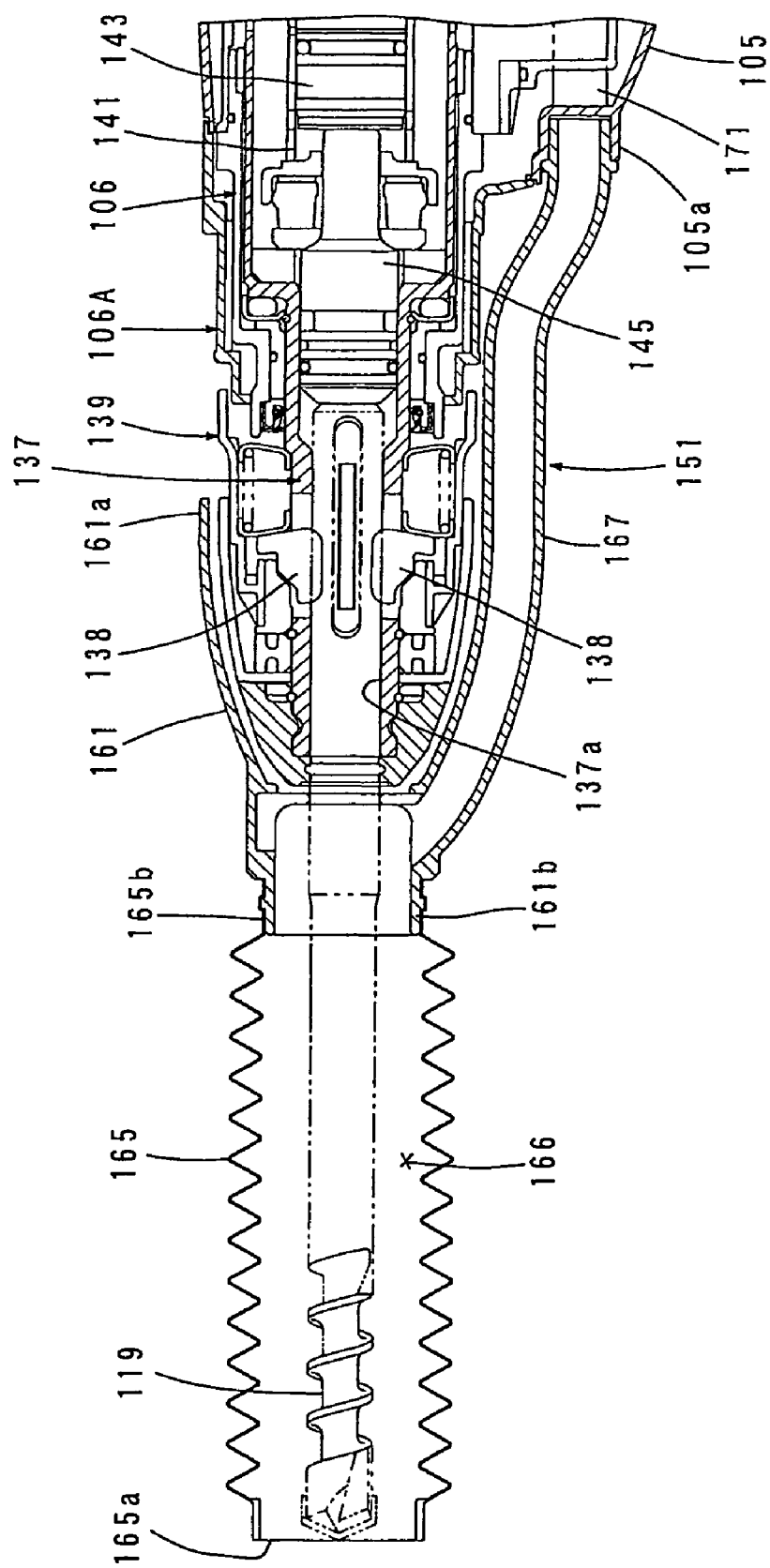
FIG. 4 is a partially enlarged sectional view of FIG. 1.
Figure 5:
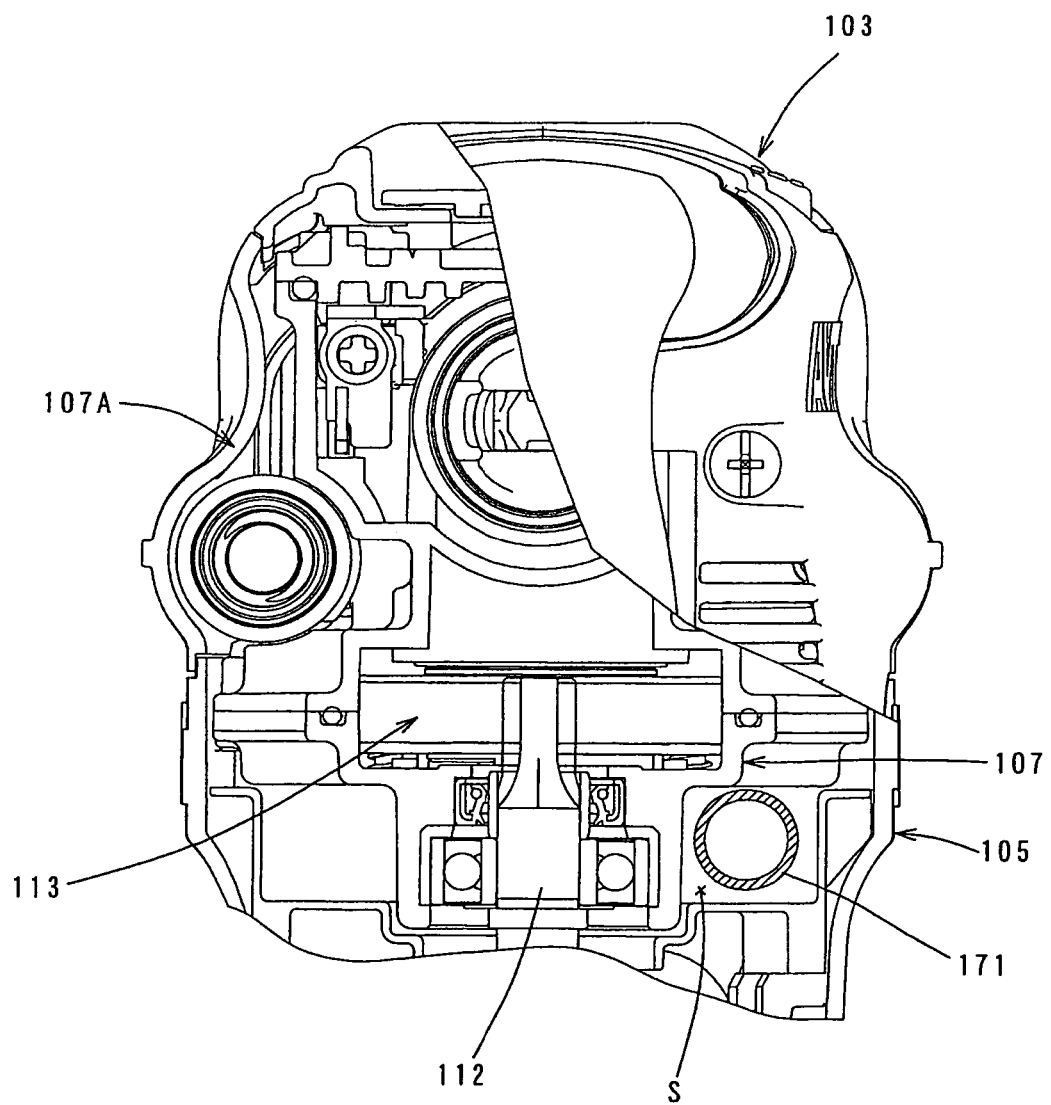
FIG. 5 is a sectional view taken along line A-A in FIG. 1.
Figure 6:
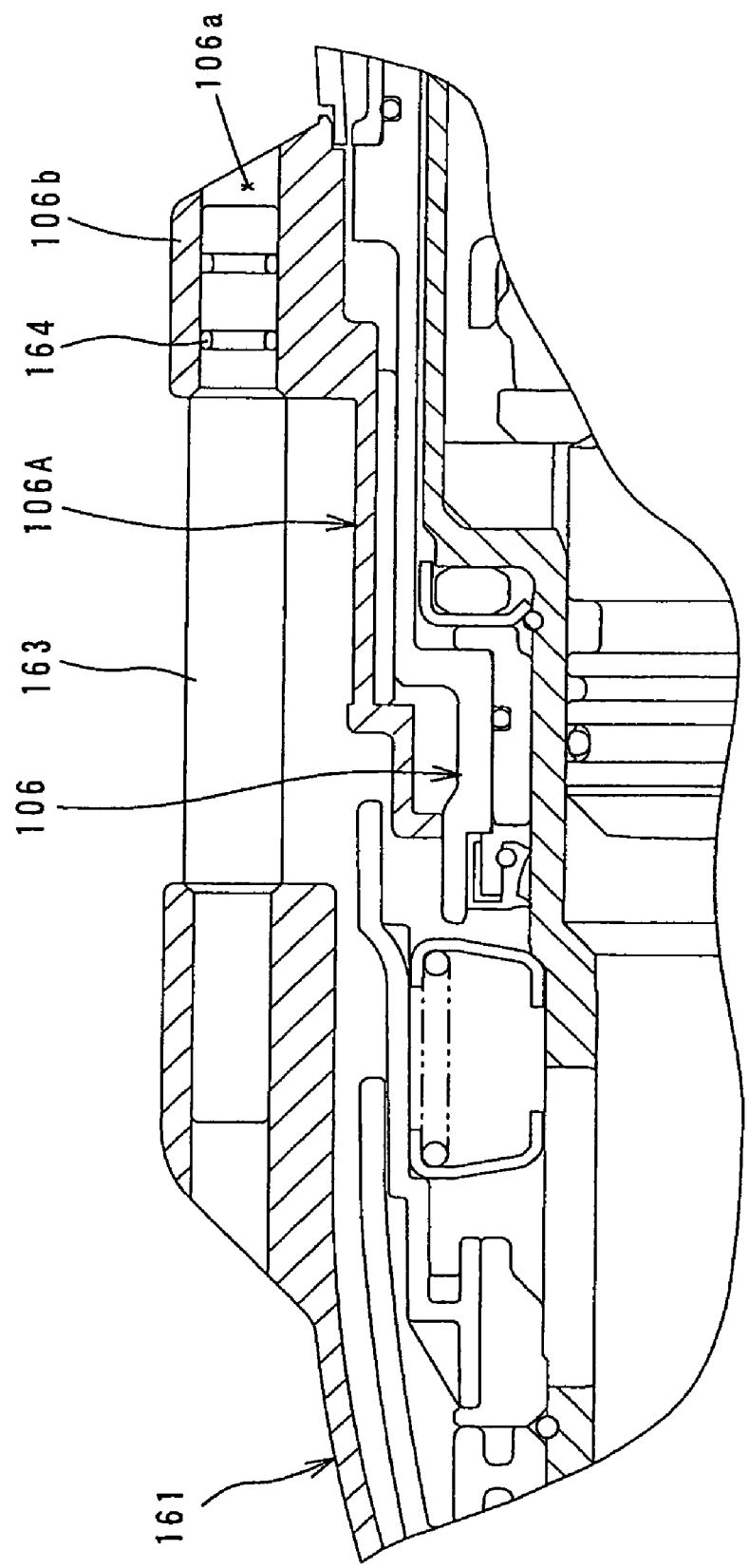
FIG. 6 is a sectional view taken along line B-B in FIG. 1.
Figure 7:
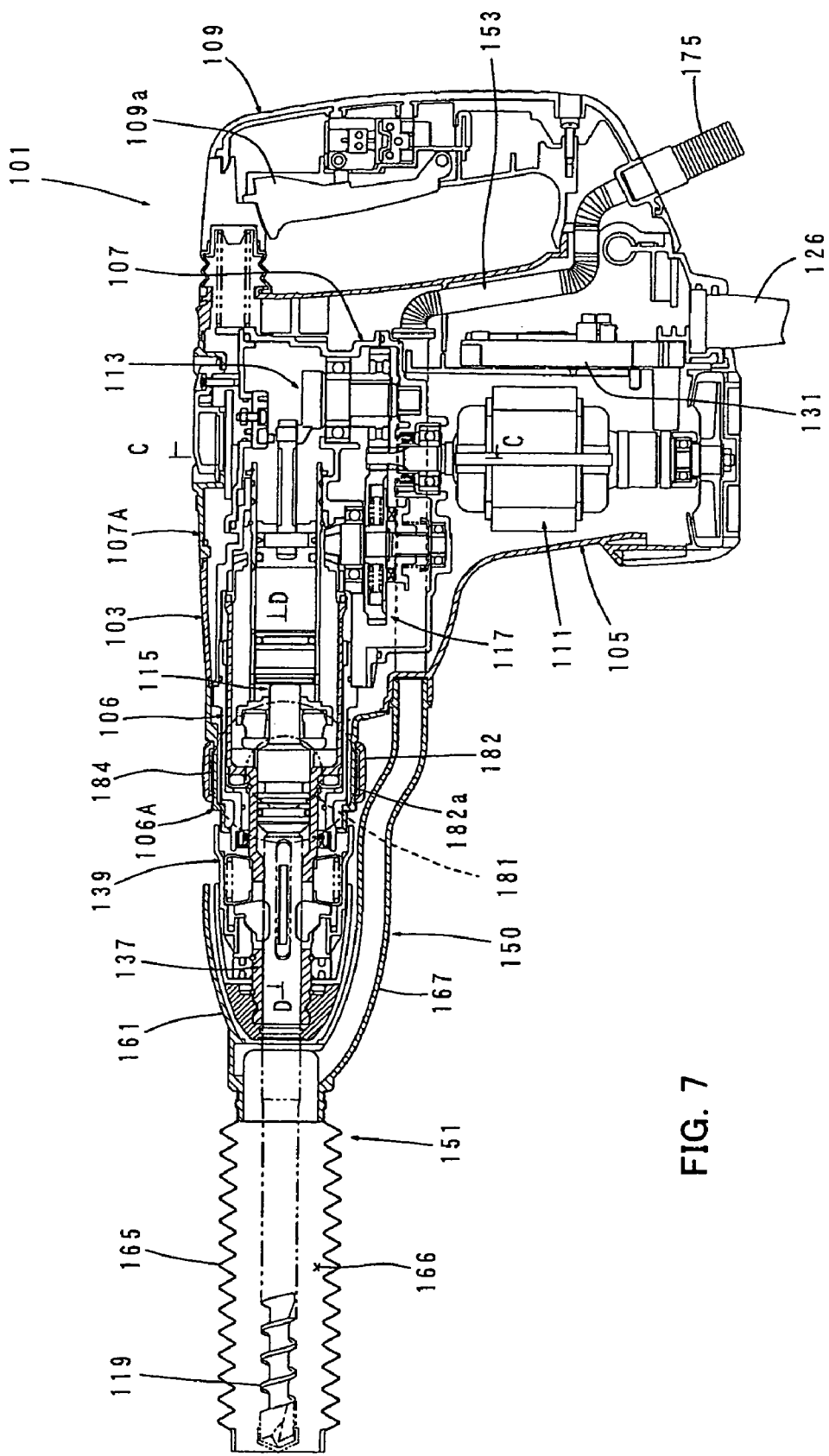
FIG. 7 is a sectional side view showing an entire structure of an electric hammer drill according to a second embodiment of the invention.
Figure 8:
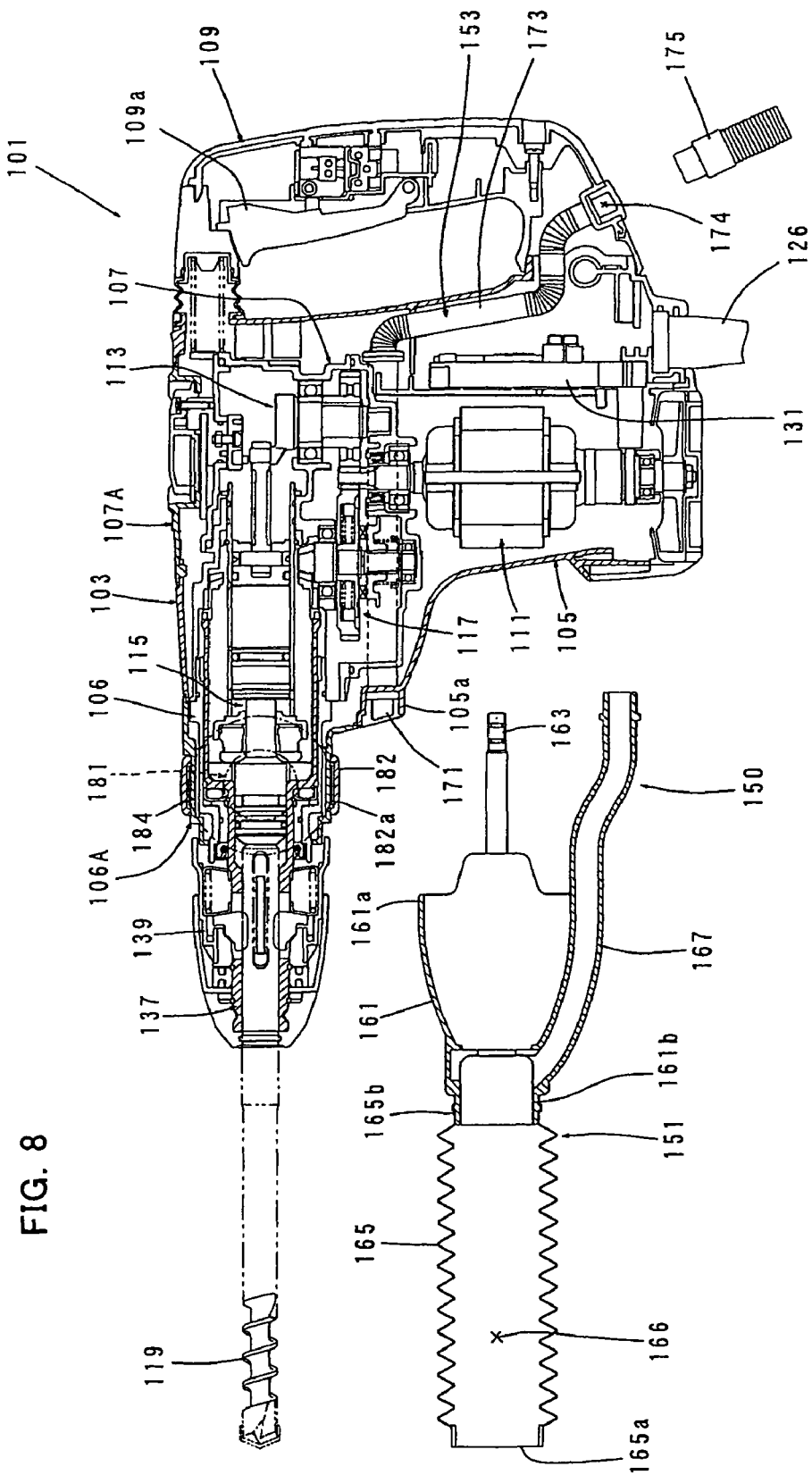
FIG. 8 is also a sectional side view showing the entire structure of the hammer drill, in the state in which a dust suction unit is not yet attached to the hammer drill.
Figure 9:
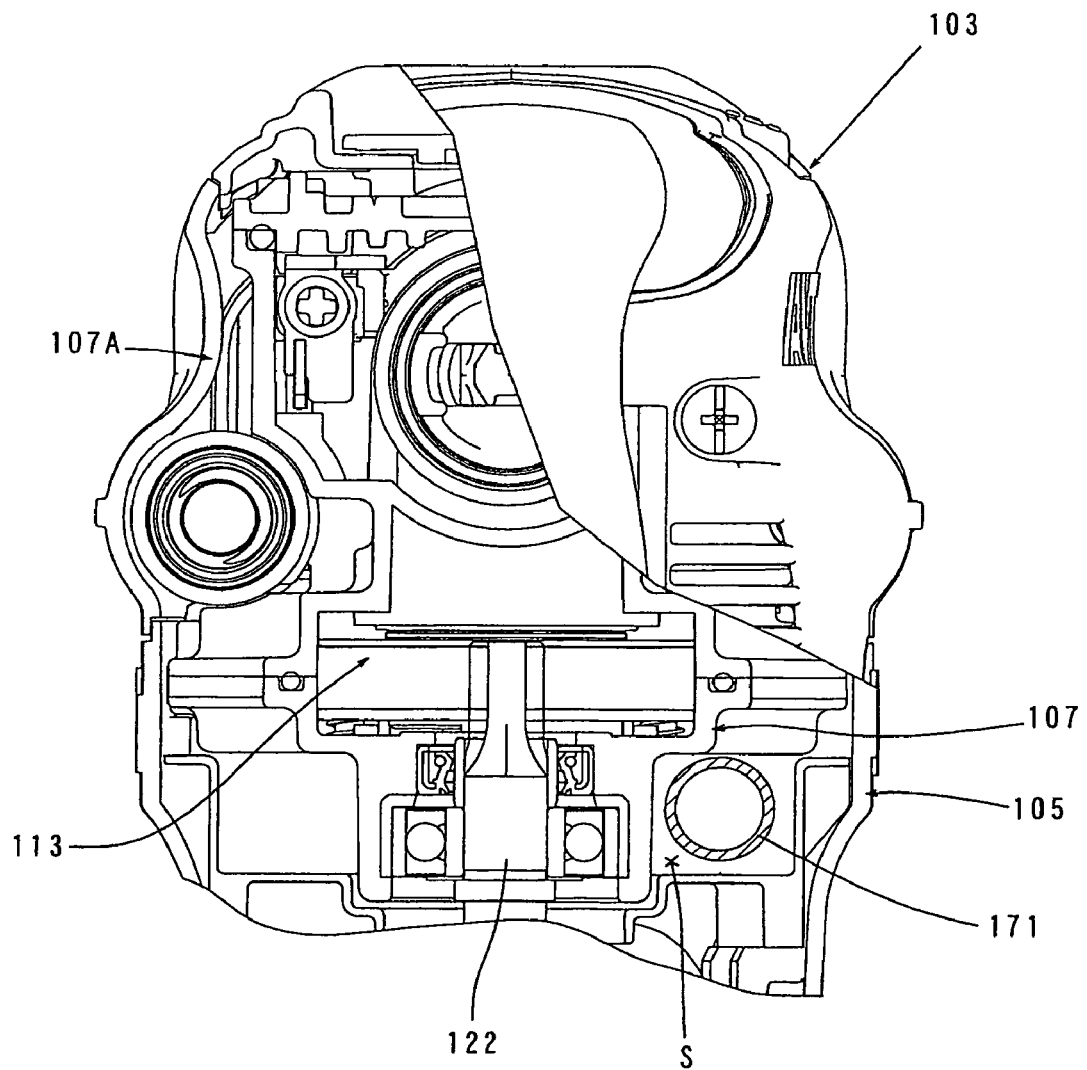
FIG. 9 is a sectional view taken along line C-C in FIG. 7.

A first representative embodiment of the invention is now described with reference to FIGS. 1 to 6. In the first embodiment, an electric hammer drill is explained as a representative example of a power tool according to the invention. FIGS. 1 and 2 mainly show an entire electric hammer drill 101. FIG. 2 shows the state in which a dust suction unit 151 is not yet attached to the hammer drill 101. FIGS. 3 and 4 are partially enlarged sectional views of FIG. 1. FIG. 5 is a sectional view taken along line A-A in FIG. 1 and FIG. 6 is a sectional view taken along line B-B in FIG. 1.

As shown in FIGS. 1 to 4, the representative hammer drill 101 includes a body 103 that forms an outer shell of the hammer drill 101, a hammer bit 119 detachably coupled to a tip end region (left end as viewed in FIG. 1) of the body 103 via a tool holder 137, and a handgrip 109 designed to be held by a user and connected to the body 103 on the side opposite to the hammer bit 119. The body 103, the hammer bit 119 and the handgrip 109 are features that correspond to the "tool body", the "tool bit" and the "handle", respectively, according to the invention. The hammer bit 119 is held by the tool holder 137 such that it is allowed to reciprocate with respect to the tool holder in its axial direction and prevented from rotating with respect to the tool holder in its circumferential direction. For the sake of convenience of explanation, in a horizontal position of the body 103 in which the axial direction of the hammer bit 119 coincides with a horizontal direction, the side of the hammer bit 119 is taken as the front and the side of the handgrip 109 as the rear.

The hammer bit 119 is prevented from becoming detached from the tool holder 137 by engaging with a lock claw 138 when inserted into a bit holding hole 137a of the tool holder 137. When the user slides an unlocking operation sleeve 139 disposed in the tip end region of the body 103, rearward in the axial direction of the hammer bit, the lock claw 138 is disengaged from the hammer bit 119. In this disengaged state, the hammer bit 119 can be removed from the bit holding hole 137a of the tool holder 137.

The body 103 includes a motor housing 105 that houses a driving motor 111, a gear housing 107 that houses a driving mechanism in the form of a motion converting mechanism 113 and a power transmitting mechanism 117, a generally cylindrical barrel 106 that houses a striking mechanism 115, a gear housing cover 107A that covers the gear housing 107, and a barrel cover 106A that covers the barrel 106. In a horizontal position of the body 103 in which the axial direction of the hammer bit 119 coincides with a horizontal direction, the gear housing 107 is covered from the outside by the gear housing cover 107A and an upper region of the motor housing 105. Therefore, the gear housing 107 that houses the motion converting mechanism 113 and the power transmitting mechanism 114 forms an inner housing, and the gear housing cover 107A that is disposed to cover an outside part of the gear housing 107, and part of the motor housing 105 form an outer housing.

The motion converting mechanism 113 converts the rotating output of the driving motor 111 into linear motion and then transmits it to the striking mechanism 115. Then, an impact force is generated in the axial direction of the hammer bit 119 via the striking mechanism 115. Further, the power transmitting mechanism 114 serves to appropriately reduce the speed of the rotating output of the driving motor 111 and transmit it to the hammer bit 119 so that the hammer bit 119 is caused to rotate in its circumferential direction. The driving motor 111 is disposed below the axis of the hammer bit 119 such that an extension of an axis of an output shaft 112 crosses the axis of the hammer bit 119. The driving motor 111 is driven when the user depresses a trigger 109a on the handgrip 109.

The motion converting mechanism 113 is mainly formed by a crank mechanism. The crank mechanism is constructed such that a driving element in the form of a piston 129 which forms a final movable member in the crank mechanism is caused to linearly move in the axial direction of the hammer bit within a cylinder 141 when driven by the driving motor 111. The power transmitting mechanism 117 is mainly formed by a gear speed reducing mechanism including a plurality of gears and transmits the torque of the driving motor 111 to the tool holder 137. As a result, the tool holder 137 is caused to rotate in a vertical plane, and thus the hammer bit 119 held by the tool holder 137 also rotates. The constructions of the motion converting mechanism 113 and the power transmitting mechanism 117 are known and therefore their detailed description is omitted.

The striking mechanism 115 mainly includes a striking element in the form of a striker 143 which is slidably disposed within the bore of the cylinder 141 together with the piston 129, and an intermediate element in the form of an impact bolt 145 which is slidably disposed within the tool holder 137. The striker 143 is driven via an air spring action (pressure fluctuations) of an air chamber 141a of the cylinder 141 by sliding movement of the piston 129, and then the striker 143 collides with (strikes) the impact bolt 145 and transmits the striking force to the hammer bit 119 via the impact bolt 145.

The hammer drill 101 can be switched between a hammer mode and a hammer drill mode by appropriate operation of the user. In the hammer mode, the hammer drill 101 performs a hammering operation on a workpiece by applying only a striking force to the hammer bit 119 in its axial direction, and in the hammer drill mode, the hammer drill 101 performs a hammer drill operation on a workpiece by applying a striking force in the axial direction and a rotating force in the circumferential direction to the hammer bit 119. The hammer drive for applying only a striking force to the hammer bit 119 in its axial direction and the hammer drill drive for applying a striking force in the axial direction and a rotating force in the circumferential direction to the hammer bit 119, and mode switching between hammer mode and hammer drill mode are known techniques and not directly related to the invention, and therefore they are not described in further details.

When the driving motor 111 is driven, the rotating output of the driving motor 111 is converted into linear motion via the motion converting mechanism 113 and then causes the hammer bit 119 to perform linear movement or hammering movement in the axial direction via the striking mechanism 115. Further, in addition to this hammering movement, rotation is transmitted to the hammer bit 119 via the power transmitting mechanism 117 which is driven by the rotating output of the driving motor 111, so that the hammer bit 119 is caused to perform drilling movement in the circumferential direction. Specifically, in hammer drill mode, the hammer bit 119 performs hammering movement in the axial direction and drilling movement in the circumferential direction, so that a hammer drill or a drilling operation is performed on a workpiece. In hammer mode, rotating power transmission of the power transmitting mechanism 117 is interrupted by a clutch. Therefore, the hammer bit 119 performs only hammering movement in the axial direction, so that a hammering operation is performed on a workpiece.

A dust suction device 150 is now explained with reference to FIGS. 1 to 6. The dust suction device 150 is attached to the hammer drill 101 having the above-described construction and serves to suck dust generated during operation on a workpiece such as concrete.

The dust suction device 150 is used when a drilling operation is performed on a workpiece, and mainly includes a dust suction unit 151 (see FIGS. 1, 2 and 4) which is attached to the tip end region of the body 103, and a dust transfer passage 153 (see FIGS. 1 to 3) disposed within the body 103. The dust suction unit 151 and the dust transfer passage 153 are features that correspond to the "dust suction part" and the "dust transfer passage", respectively, according to this invention. The dust suction unit 151 includes a generally conical cap 161 having both ends open in its longitudinal direction and made, for example, of hard synthetic resin, and a generally cylindrical rubber bellows 165 which can expand and contract in the axial direction of the hammer bit 119 and has both ends open in the axial direction. The cap 161 and the bellows 165 are features that correspond to the "fixed region" and the "movable region", respectively, according to this invention.

The cap 161 is disposed to cover the outer circumferential surface of the tip end region of the body 103 (see FIGS. 1 and 4). Specifically, the cap 161 has such a length in the axial direction of the hammer bit that covers a region extending from the tip end (front end) of the body 103 to a front portion of the unlocking sleeve 139. With a rear portion of the unlocking sleeve 139 exposed to the outside, the cap 161 is mounted to the barrel cover 106A via right and left mounting rods 163 provided on a rear open end 161a. Therefore, the user can operate the unlocking sleeve 139 to attach and detach the hammer bit 119, with the dust suction unit 151 kept mounted to the body 103.

Each of the two mounting rods 163 is a longitudinally extending member having a circular section and disposed on a rear open end 161a with a spacing of about 180 degrees therebetween in the circumferential direction. The mounting rods 163 extend rearward in parallel to each other, passing the outside of the unlocking sleeve 139 and along the side of the barrel cover 106A. Two right and left mounting holes 106a (see FIG. 6) are formed through a rear end portion of the barrel cover 106A in the axial direction of the hammer bit in order to mount the mounting rods 163. Extending ends (rear ends) of the two mounting rods 163 are removably inserted into the mounting holes 106a, so that the dust suction unit 151 is detachably mounted to the body 103.

The mounting holes 106a are formed in an overhang 106b overhanging outward from the barrel cover 106A. Further, a front end of each of the mounting rods 163 is fixed to the cap 161 by press fitting into a hole formed in the rear open end 161a of the cap 161, or by insert molding in the cap 161 in the process of forming the cap 161. Further, an O-ring 164 is fitted on the mounting rod 163, so that the inserted state of the mounting rod 163 in the mounting hole 106a is maintained by friction between the O-ring 164 and the wall surface of the mounting hole 106a.

The bellows 165 is disposed to cover the hammer bit 119 (see FIGS. 1 and 4) when the cap 161 is mounted to the barrel cover 106A. In this state, the bellows 165 entirely covers the hammer bit 119 and forms a dust passage 166 (space) between the bellows and the hammer bit 119. One open end (left end as viewed in FIGS. 1 and 2) of the bellows 165 is designed as a dust suction port 165a, and the tip end of the hammer bit 119 is located on the dust suction port 165a. Further, the other open end of the bellows 165 is designed as a connection port 165b for connection to the cap 161. The connection port 165b is detachably fitted on an open end 161b of the front end (left end as viewed in FIGS. 1 and 2) of the cap 161. Specifically, the bellows 165 is designed to be detachable from the cap 161.

Further, a connecting passage 167 is formed on the cap 161 and connects the passage 166 in the bellows 165 and the dust transfer passage 153. The connecting passage 167 is a feature that corresponds to the "connecting passage" according to this invention. The connecting passage 167 is a pipe-like member having a circular section and integrally formed with the cap 161. One end of the connecting passage 167 is open to the inside of the front portion of the cap 161, and the other end communicates with the dust transfer passage 153.

The dust transfer passage 153 mainly includes a pipe 171 having both ends open and extending generally parallel to the axial direction of the hammer bit 119 within the body 103, and a flexible hose 173 connected to the pipe 171. In this embodiment, as shown in FIG. 5, the pipe 171 is placed to extend in the longitudinal direction through a space S above the output shaft 112 of the driving motor 111, or particularly through a space S between an inner wall surface of the motor housing 105 and an outer wall surface of a lower region of the gear housing 107 covered by the motor housing 105. The open front end of the pipe 171 protrudes forward through the front wall surface of the motor housing 105 and is exposed to the outside (see FIG. 2). The rear open end of the connecting passage 167 on the cap 161 is connected to the exposed open front end of the pipe 171. Further, the open front end of the pipe 171 is surrounded by a tubular cover 105a which is integrally formed with the motor housing 105, so that the open front end is protected from being subjected to external forces, for example, in the state in which it is not connected to the connecting passage 167 of the cap 161.

The hose 173 is connected to the rear end of the pipe 171 and bent in such a manner as to extend downward behind a controller 131 disposed within the motor housing 105. The controller 131 is a controlling section for controlling in relation to power supply of the driving motor 111. The handgrip 109 includes a grip part 121 extending in a vertical direction transverse to the axial direction of the hammer bit 119, and connecting parts 122, 123 extending forward from upper and lower ends of the grip part 121. The upper and lower connecting parts 122, 123 are connected to the rear of the motor housing 105. Thus, the handgrip 109 forms a loop-shaped handle (D-shaped handle). The grip part 121 is a feature that corresponds to the "grip part" according to this invention. Further, the grip part 121 and the lower connecting part 123 are hollow.

The hose 173 extending downward within the motor housing 105 is further bent in such a manner as to pass through the motor housing 105 and extend into the internal space of the lower connecting part 123 (one of the connecting parts 123 which is remote from the trigger 109a). Specifically, the hose 173 extends to the connecting part 123 or one of the upper and lower connecting parts 121, 123 of the handgrip 109 which is remote from the axis of the hammer bit 119. A lower end of the hose 173 forms a dust discharge port 174 through which dust led through the hose 173 is discharged to the outside. The dust discharge port 174 is a feature that corresponds to the "dust discharge port" according to this invention. The dust discharge port 174 protrudes obliquely rearward and downward from inside the lower connecting part 123 of the handgrip 109 to the outside and is exposed (see FIG. 2). The exposed end or the dust discharge port 174 can be connected to a dust collecting hose 175 of a dust collector by inserting the dust collecting hose 175 obliquely upward into the dust discharge port 174. Further, the dust discharge port 174 of the hose 173 is surrounded by a tubular cover 123a which is integrally formed with the lower connecting part 123, so that the dust discharge port 174 is protected from being subjected to external forces in the state in which the dust collecting hose 175 is not connected to the dust discharge port 174.

The handgrip 109 is designed as a vibration-proof handle in which the lower connecting part 123 is connected to the body such that it can rotate on a pivot 124 in the longitudinal direction and the upper connecting part 122 is elastically connected to the body via an elastic member in the form of a coil spring 125. Further, a cord guard 126 is provided adjacent to the lower connecting part 123 of the handgrip 109 in a lower region of the motor housing 105, and an AC cord (not shown) for AC power supply to the driving motor 111 and the controller 131 is inserted through the cord guard 126. The cord guard 126 extends linearly such that the AC cord is inserted in the vertical direction. The AC cord is a feature that corresponds to the "electric cord" according to this invention.

The dust suction device 150 according to this embodiment is constructed as described above. Therefore, when a hammer drill operation is performed on a workpiece such as a concrete, the dust collecting hose 175 of the dust collector is connected to the dust discharge port 174 of the hose 173. When the dust collector is driven and the hammer drill 101 is driven with the hammer bit 119 pressed against the workpiece in order to perform an operation by causing the hammer bit 119 to perform hammering movement in the axial direction and drilling movement in the circumferential direction, dust generated during operation is sucked into the dust suction port 165a of the bellows 165 which is pressed against the workpiece. Dust sucked into the dust suction port 165a passes through the passage 166 within the bellows 165, the connecting passage 167 of the cap 161, the pipe 171 and the hose 173 and is then led into a dust collecting box of a dust collector through the dust collecting hose 175 of the dust collector which is connected to the dust discharge port 174 of the hose 173. When the hammer bit 119 digs into the workpiece during operation, the rubber bellows 165 contracts rearward with respect to the hammer bit so that the dust suction port 165a is held in contact with the surface of the workpiece and dust can be sucked up.

Further, because the driving motor 111 is disposed such that an extension of the rotational axis of the driving motor 111 runs in a direction transverse to the axial direction of the hammer bit 119, dust generated during operation is collected by using a dust collector through the dust transfer passage 153 formed by the pipe 171 and the hose 173 which extend within the body 103. In a construction as described above in which the driving motor 111 is arranged such that an extension of the rotational axis of the driving motor 111 runs in a direction transverse to the axial direction of the hammer bit 119, naturally, the space S extending in the axial direction of the hammer bit 119 is structurally formed between the inner surface of the motor housing 105 and the outer surface of the lower region of the gear housing 107 which houses the motion converting mechanism 113 and the power transmitting mechanism 117, or between the inner housing and the outer housing. According to this embodiment, the pipe 171 which is a component of the dust transfer passage 153 is disposed within this space S, so that the space S can be rationally utilized. The space S is a feature that corresponds to the "internal space" according to this invention.

Further, in this embodiment, the dust transfer passage 153 is formed by using the flexible hose 173 in a region in which it extends from an upper part to a lower part of the motor housing 105 and further extends through the motor housing 105 into the connecting part 123 of the handgrip 109. Therefore, flexibility is provided in pipe routing.

Further, the end of the hose 173 or the dust discharge port 174 is located on the opposite side of the driving motor 111 from the hammer bit 119, or on the lower connecting part 123 of the handgrip 109. Therefore, in a normal operating state in which the user holds the grip part 121 of the handgrip 109 with the little finger side down, the dust collecting hose 175 connected to the dust discharge port 174 is located on the side of the little finger of the hand holding the grip part 121 and runs downward. Thus, the dust collecting hose 175 which is located at the side of the user's hand holding the handgrip 109 is avoided from interfering with the operation of the handgrip 109 and does not impair the operability.

Particularly, in this embodiment, the dust discharge port 174 is disposed adjacent to an inlet part or the cord guard 126 through which the AC cord is led into the body 103. With this construction, the AC cord and the dust collecting hose 175 which is connected to the dust discharge port 174 can be moved like one piece with respect to each other. Thus, the operability in operating the power tool can be improved.

Further, in this embodiment, the bellows 165 is detachable from the cap 161. Therefore, in case of damage to the bellows 165, only the bellows 165 can be replaced, so that the cost of repair can be reduced.

Further, according to this embodiment, in order to attach the dust suction unit 151, the at least two mounting rods 163 which extend as laterally passing the unlocking sleeve 139 is inserted into the mounting holes 106a of the barrel cover 106A. With this construction, the user can operate the unlocking sleeve 139 to attach and detach the hammer bit 119 with the dust suction unit 151 held mounted to the barrel cover 106A.

(Second Representative Embodiment)

A second representative embodiment of the invention is now described with reference to FIGS. 7 to 10. In the second embodiment, in addition to the handgrip 109, a side grip 181 is mounted to the body 103 of the hammer drill 101. In the other points, it has the same construction as the above-described first embodiment. Therefore, components and elements which are substantially identical to those in the first embodiment are given like numerals and are not described or only briefly described. The side grip 181 is a feature that corresponds to the "side handle" according to this invention.

The side grip 144 is a rod-like member that extends horizontally in a direction transverse to the axial direction of the hammer bit 119 and mainly includes a grip body 182 that is detachably mounted to the barrel cover 106A and a grip part 183 to be held by a user. The grip part 183 is formed by a hollow cylindrical member connected at one longitudinal end to the grip body 182. A grip mounting part 184 is formed on the barrel cover 106A by a circumferential surface having a predetermined width and extending parallel to the longitudinal direction of the body 103.

A generally semi-circular engagement surface (not particularly shown in drawings) is formed on front and rear side plates of the grip body 182 in the axial direction of the hammer bit. Further, the grip body 182 has a fastening band 182a and a threaded control rod 182b for controlling the band. One end of the threaded control rod 182b is connected to the fastening band 182a, and the other end extends within a bore of the grip part 183. A threaded portion is formed on the extending end of the control rod 182b and threadably engaged with a nut (not shown) which turns together with the grip part 183.

In order to mount the side grip 181 to the grip mounting part 184, first, the body 103 is inserted from its tip end (on the hammer bit 119 side) into a circular region which is defined by the engagement surface of the grip body 182 and the fastening band 182a, and the circular region is positioned on the grip mounting part 184 of the barrel cover 106A. In this state, the nut is turned together with the grip part 183 with respect to the grip body 182. Thus, the fastening band 182a is moved toward the engagement surface by the threaded control rod 182b, so that the grip mounting part 184 is held between the fastening band 182a and the engagement surface. In this manner, the side grip 181 is mounted to the barrel cover 106A.

Figure 10:
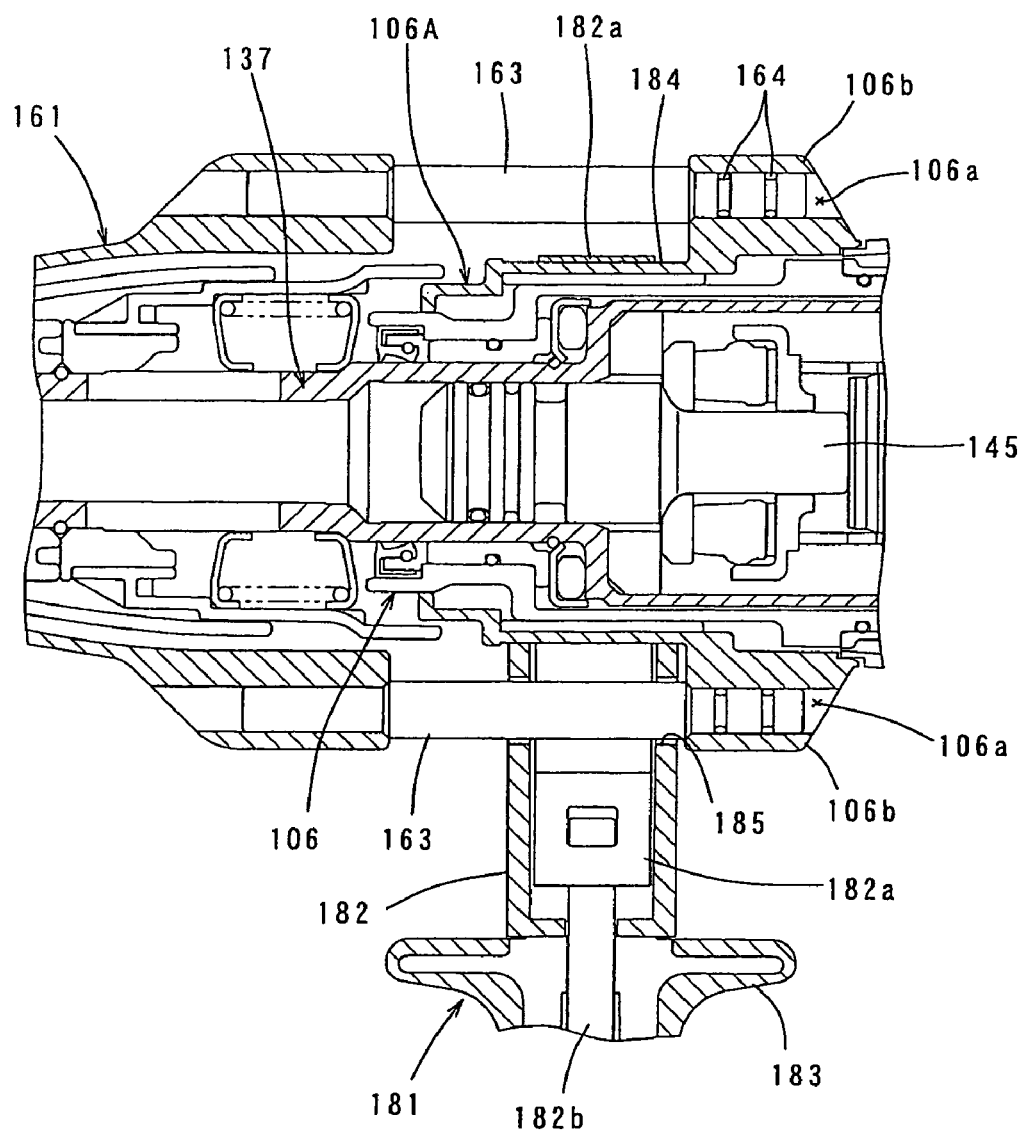
FIG. 10 is a sectional view taken along line D-D in FIG. 7.

In this embodiment, the dust suction unit 151 of the dust suction device 150 is detachably mounted to the tip end region of the body 103, with the side grip 181 mounted to the barrel cover 106A. For this purpose, as shown in FIG. 10, a circular through hole 185 is formed through the grip body 182 of the side grip 181 on the side of connection with the grip part 183, and one of the two mounting rods 163 on the dust suction unit 151 is loosely inserted through the through hole 185. The right and left mounting holes 106a formed in the barrel cover 106A is arranged on a circular arc having its center on the axis of the hammer bit 119 such that the mounting rods 163 can be mounted. The through hole 185 of the grip body 182 is correspondingly arranged on the same circular arc as the mounting holes 106a, with the side grip 181 mounted to the grip mounting part 184 of the barrel cover 106A.

Therefore, when the side grip 181 is mounted to the grip mounting part 184, the through hole 185 is positioned to face the one mounting rod 163, and in this state, the mounting rod 163 can be inserted into the associated mounting hole 106a through the through hole 185. At this time, the other mounting rod 163 passes the outside of the fastening band 182a and can be inserted into the other mounting hole 106a. Therefore, the side grip 181 can be mounted to the grip mounting part 184 such that it extends either laterally leftward or rightward, when viewed from the rear of the hammer drill 101. Further, the dust suction unit 151 itself has the same construction as in the above-described first embodiment.

According to this embodiment, as described above, the mounting rod 163 of the dust suction unit 151 is mounted by inserting into the mounting hole 106a of the barrel cover 106A through the through hole 185 of the side grip 181, with the side grip 181 mounted to the grip mounting part 184 of the barrel cover 106A. With this construction, the dust suction unit 151 can be attached and detached from the barrel cover 106A, with the side grip 181 held mounted to the grip mounting part 184 of the barrel cover 106A. Therefore, it is not necessary to take the trouble of attaching or detaching the side grip 181 when attaching or detaching the dust suction unit 151. The dust suction device 150 can be rationally applied to the hammer drill 101 with a side grip. Further, the dust suction device 150 according to this embodiment has the same effect as that of the above-described first representative embodiment.

(Third Representative Embodiment)

A third representative embodiment of the invention is now described with reference to FIGS. 11 to 19. In this embodiment, as shown in FIGS. 11 to 15, a plurality of suction holes 172 are formed in the dust transfer passage 153 disposed within the body 103 in the hammer drill 101 and serve to provide communication between the inside of the dust transfer passage 153 and the space S of the body 103 (space between the inner housing and the outer housing) such that heat within the body 103 and dust which enters the body 103 are allowed to escape to the outside through the suction holes 172.

Figure 11:
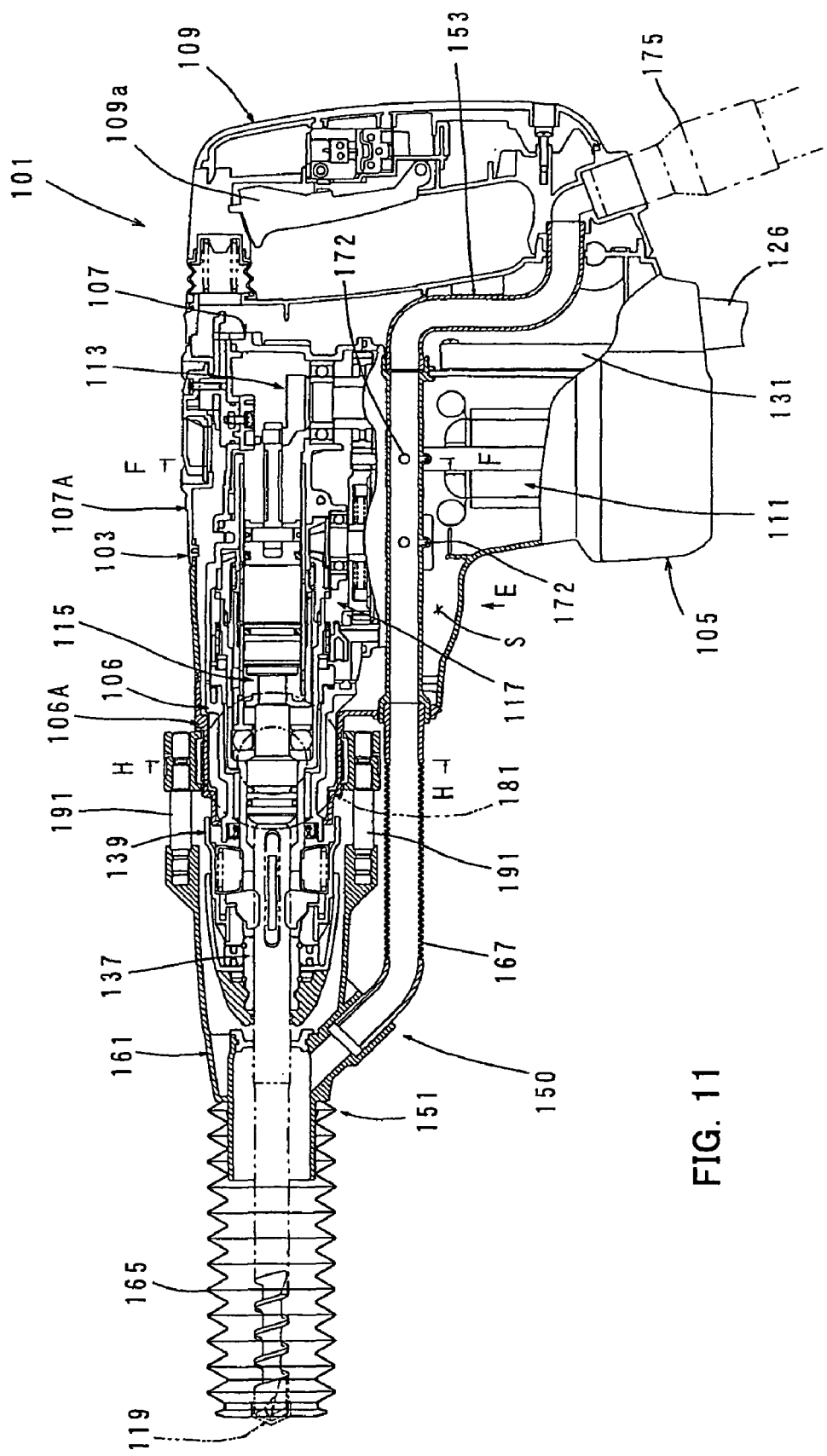
FIG. 11 is a sectional side view showing an entire structure of an electric hammer drill according to a third embodiment of the invention.
Figure 13:
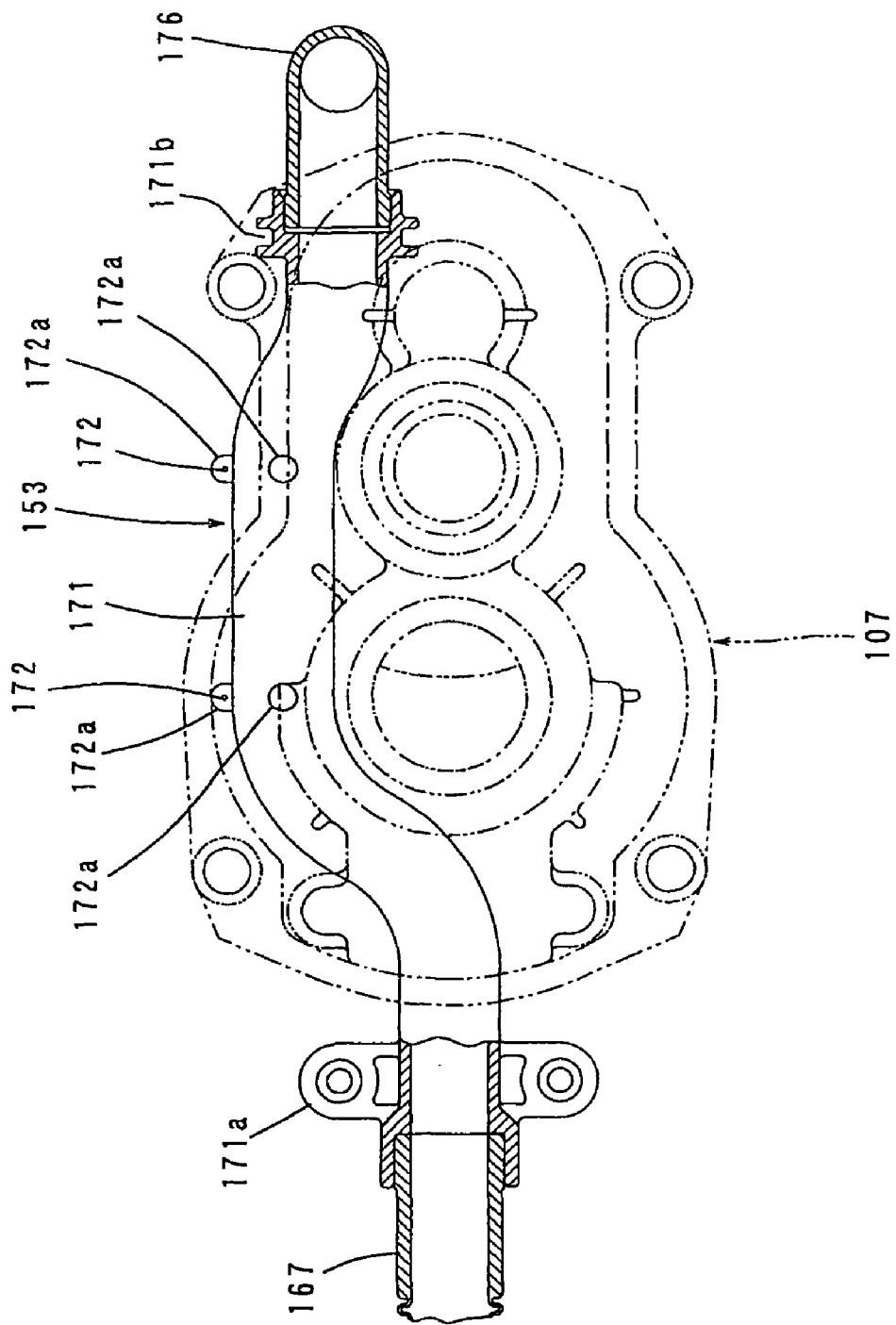
FIG. 13 is a view as viewed from the direction of the arrow E in FIG. 11.
Figure 14:
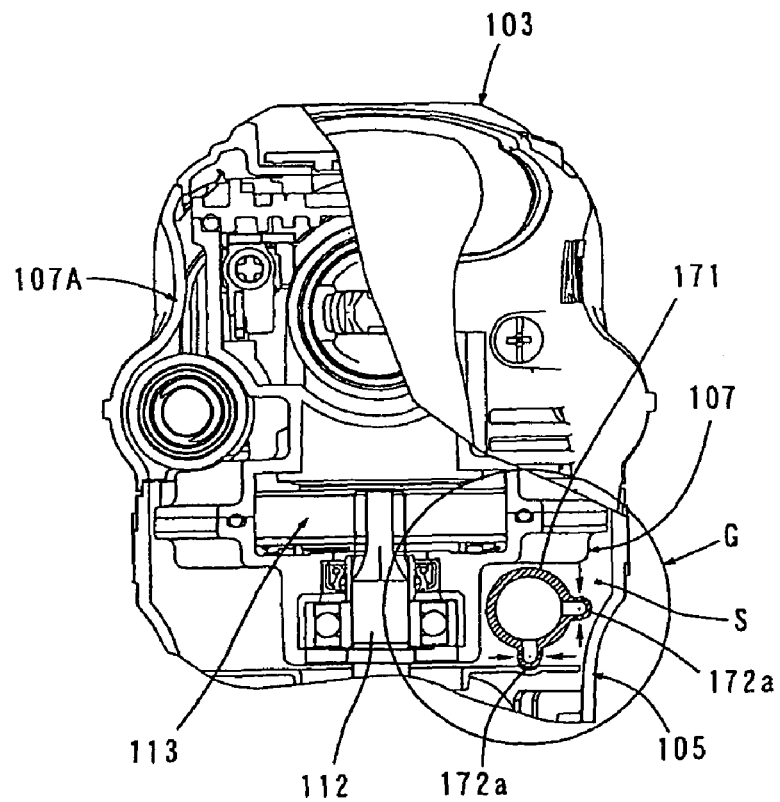
FIG. 14 is a sectional view taken along line F-F in FIG. 11.
Figure 15:
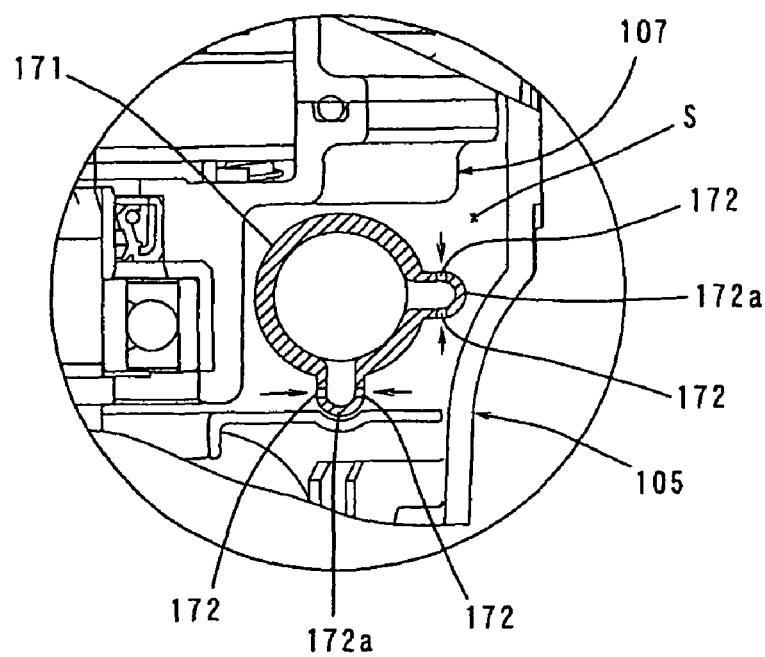
FIG. 15 is an enlarged view of part G in FIG. 14.

Specifically, in the pipe 171 which is disposed in the space S formed between the inner wall surface of the motor housing 105 and the outer wall surface of the lower region of the gear housing 107 covered by the motor housing 105, the suction holes 172 are formed to provide communication between the inside of the pipe 171 and the space S, so that heat generated within the body 103 and dust which enters the body 103 are allowed to escape to the outside through the suction holes 172. The suction holes 172 are features that correspond to the "openings" according to this invention. As shown in FIGS. 14 and 15, the pipe 171 is partially bulged radially outward such that a plurality of bulged projections 172a are formed. In this embodiment, as shown in FIGS. 11 and 13, four bulged projections 172a are provided on the pipe 171 with predetermined spacing therebetween in the longitudinal and circumferential directions of the pipe. As shown in FIGS. 14 and 15, two suction holes 172 are formed through each of the bulged projections 172a and extend in a direction transverse to the bulging direction of the projection. The number and size of the suction holes 172 are determined such that the essential dust sucking function of the dust collector is not remarkably impaired. Further, the entire construction of the hammer drill 101 is the same as in the first embodiment, and components thereof are given like numerals and not described.

During operation of the hammer drill 101, when the driving mechanism in the form of the motion converting mechanism 113, the striking mechanism 115 and the motion transmitting mechanism 177 is driven, the inside of the body 103 that houses these mechanisms becomes hot. In this embodiment, by provision of the suction holes 172 in the pipe 171 of the dust transfer passage 153, air within the space S is sucked into the pipe 171 through the suction holes 172 when the dust collector is driven to suck dust generated during operation. Therefore, in the space S which is surrounded by the inner housing including the gear housing 107 and the barrel 106 and the outer housing including the motor housing 105 and the gear housing cover 107A, or in the space S of the body 103, air flow into the pipe 171 is generated. Therefore, heat within the space S can be allowed to escape to the outside, so that the body 103 can be cooled. Thus, according to this embodiment, the dust transfer passage 153 serves not only as a means for transferring dust, but it can also be rationally utilized as a mechanism for cooling the space S of the body 103.

In the hammer drill 101, cooling air is led from one end side to the other end side of the driving motor 111 in its axial direction in order to cool the driving motor 111. In this case, if it is constructed, for example, such that the cooling air flows toward a carbon brush (not shown) which is provided to pass the electric current to a commutator of the driving motor 111, dust which enters the body 103 flows toward the carbon brush together with the cooling air. Therefore, dust may stick to the carbon brush and exert an adverse effect on the sliding movement of the carbon brush on the commutator.

Therefore, in this embodiment, dust which enters the space S can be sucked together with air into the pipe 171 through the suction holes 172. Thus, the amount of flow of dust toward the carbon brush can be reduced, so that the carbon brush can be protected against the adverse effect of dust.

Figure 12:
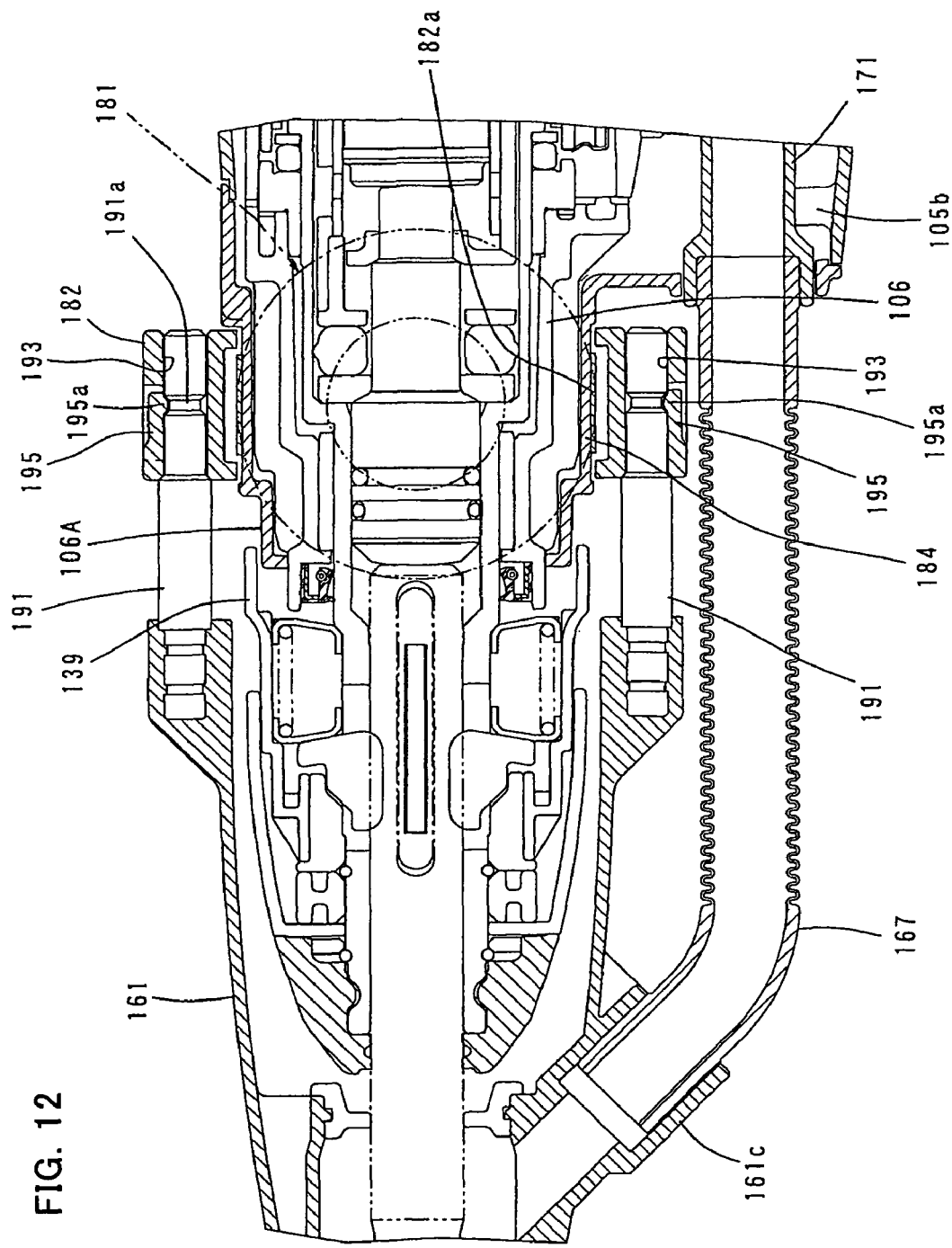
FIG. 12 is a partially enlarged sectional view of FIG. 11.
Figure 16:
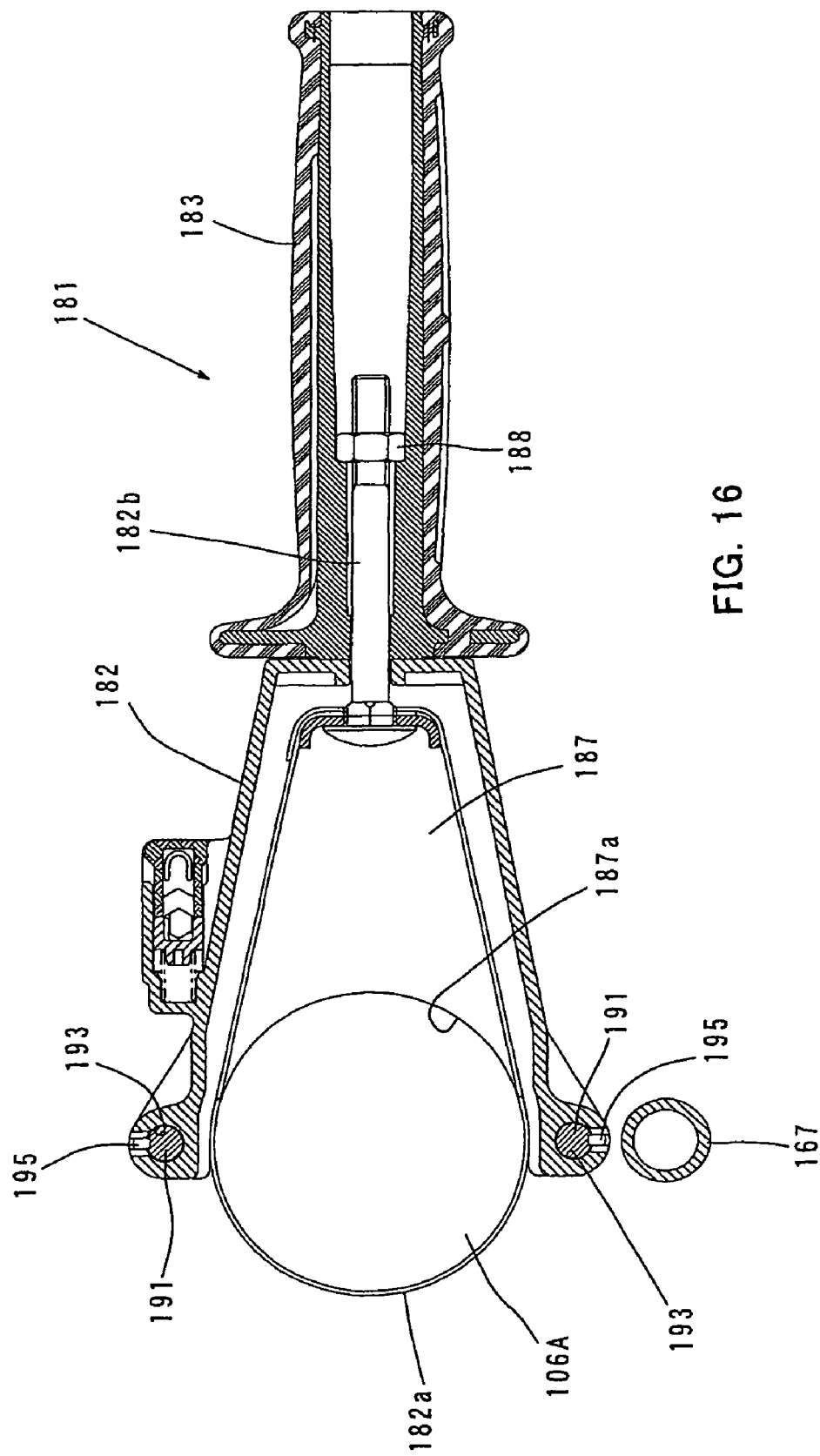
FIG. 16 is a sectional view taken along line H-H in FIG. 11.

Further, as shown in FIGS. 12 and 16, the dust suction unit 151 is mounted to the side grip 181 which is mounted to the grip mounting part 184 of the barrel cover 106A. The side grip 181 has substantially the same construction as in the above-described second embodiment, and therefore, the same components are given like numerals and not specifically described. In FIG. 16, however, some of the components of the side grip 181 which are not shown in the second embodiment, a nut 188 and a side plate 187 having an engagement surface 187a for engagement with the grip mounting part 184, are shown. Further, the way of mounting the side grip 181 to the grip mounting part 184 is also the same as in the second representative embodiment and therefor it is not described.

A structure of mounting the dust suction unit 151 to the side grip 181 is now described with reference to FIG. 12. Two poles 191 having a circular section are provided on the rear end of the cap 161 for mounting the cap 161 to the side grip 181, and the poles 191 extend rearward in parallel to each other and are spaced apart about 180 degrees from each other in the circumferential direction. Correspondingly, two engagement holes 193 which face the cap 161 are formed in the grip body 182 of the side grip 181. An end (rear end) of each pole 191 is inserted into the associated engagement hole 193. Thus, the cap 161 is mounted with its rear end facing the front end of the grip body 182 with a predetermined spacing in the axial direction of the hammer bit 119. By thus mounting the cap, a space is created between the grip body 182 of the side grip 181 and the cap 161, so that the user can insert the finger into the space to operate the unlocking sleeve 139. Therefore, like in the first embodiment, the hammer bit 119 can be attached or detached by operating the unlocking sleeve 139, with the dust suction unit 151 held mounted to the side grip 181.

An engagement member 195 is provided in the grip body 182 of the side grip 181 and has a generally semicircular engagement protrusion 195*a* which protrudes radially inward of the engagement hole 183. When the pole 191 of the cap 161 is inserted into the engagement hole 193, the engagement protrusion 195*a* of the engagement member 195 is elastically engaged with an annular engagement groove 191*a* which is formed in the outer periphery of the pole 191. Thus, the engagement member 195 is provided as a pole retaining member for retaining the pole 191 in the inserted position. When the pole 191 is pulled forward, the engagement member 195 is elastically deformed radially outward and the engagement protrusion 195*a* is disengaged from the engagement groove 191*a*, so that the pole 191 can be removed from the engagement hole 193. Therefore, the dust suction unit 151 can be attached and detached from the side grip 181 as necessary.

Figure 17:
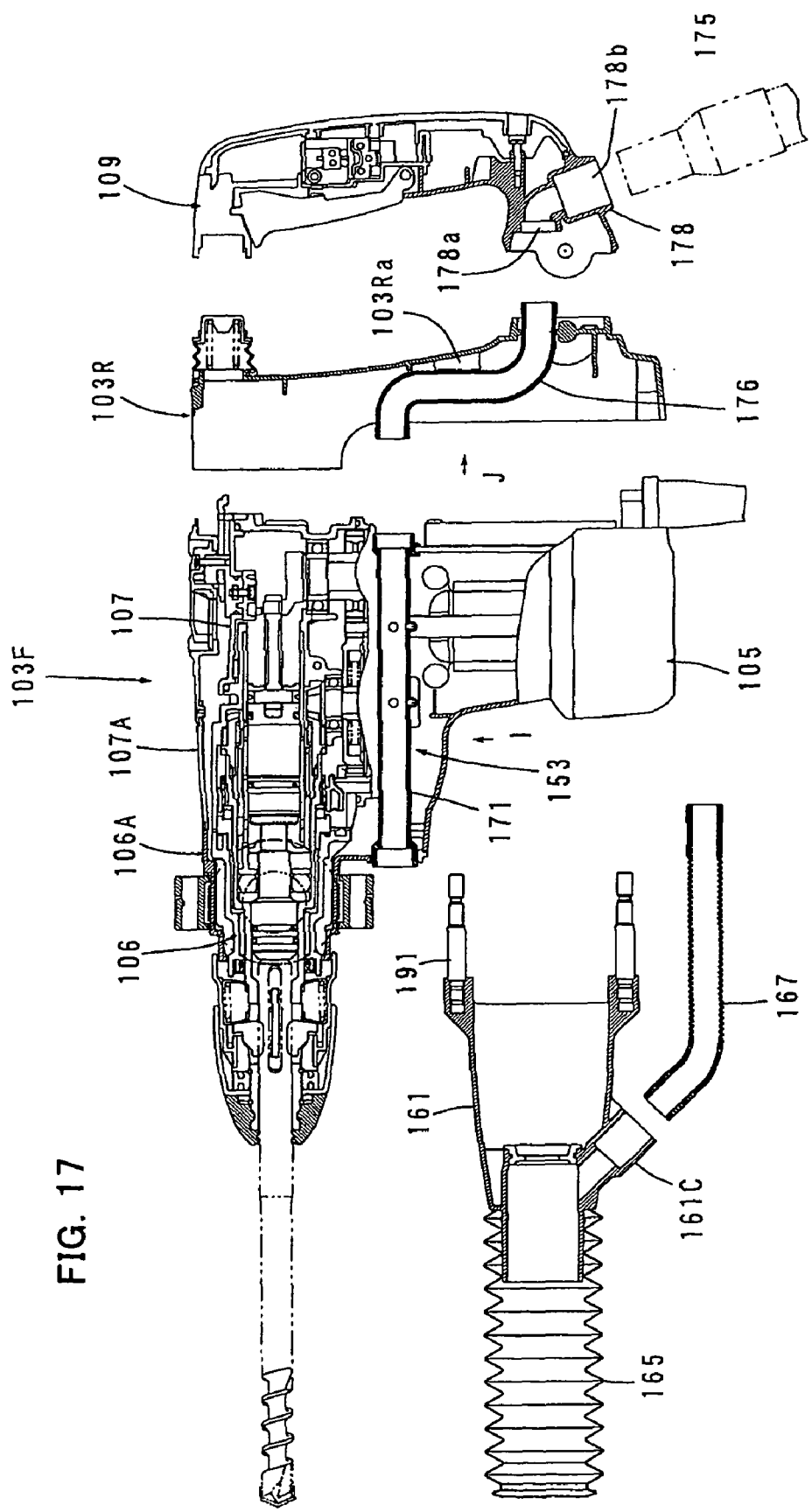
FIG. 17 is a view illustrating a split structure of a dust transfer passage of a dust suction device.

Further, as shown in FIG. 17, the body 103 of the hammer drill 101 has a split structure which is separated into a front body part 103F and a rear body part 103R in the axial direction of the hammer bit 119. The front body part 103F includes the motor housing 105, the gear housing 107, the barrel 106, the gear housing cover 107A and the barrel cover 106A. The rear body part 103R is provided as a rear covering member which covers the rear regions of the motor housing 105 and the gear housing 107. The front body part 103F is formed as one unit member by assembling the components of the front body part 103F, i.e. the motor housing 105, the gear housing 107, the barrel 106, the gear housing cover 107A and the barrel cover 106A. On the other hand, the rear body part 103R is formed as a single rear cover member. The rear body part 103R is mounted in contact from behind to the front body part 103F formed by the assembly including the motor housing 105 and the gear housing 107. The handgrip 109 is further mounted to the rear end of this rear body part 103R. The structure of mounting the handgrip 109 to the rear body part 103R is the same as in the above-described first embodiment and is not therefore described. FIG. 11 shows the assembled state. The front body part 103F, the rear body part 103R and the handgrip 109 are features that correspond to the "plurality of tool body components" according to this invention.

The dust transfer passage 153 of the dust suction device 150 has a split structure which is separated in the axial direction of the hammer bit 119 in such a manner as to correspond to the above-described split structure of the body 103. Specifically, the dust transfer passage 153 is separated into three parts, i.e. a front pipe 171, a rear pipe 176 and a dust discharge port 178. The front pipe 171 is mounted to the front body part 103F and the rear pipe 176 is mounted to the rear body part 103R in advance, and the dust discharge port 178 is integrally formed with the handgrip 109. A single dust transfer passage 153 is formed by assembling the front body part 103F and the rear body part 103R and mounting the handgrip 109 to the rear body part 103R.

Figure 18:
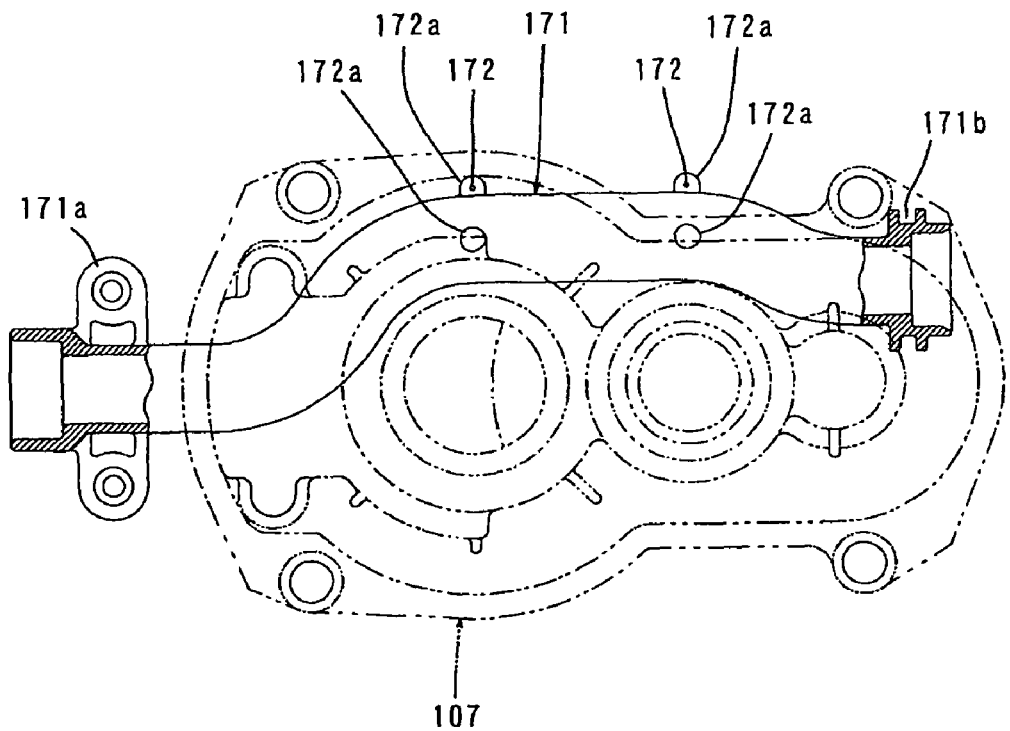
FIG. 18 is a view as viewed from the direction of the arrow I in FIG. 17.

The front pipe 171 has the suction holes 172 that provide communication between the inside of the pipe and the space S between the outer housing and the inner housing. As shown in FIGS. 14 and 15, the front pipe 171 extends generally horizontally in the longitudinal direction through a space above the output shaft 112 of the driving motor 111, or the space S between the inner wall surface of the motor housing 105 and the outer wall surface of the lower region of the gear housing 107 covered by the motor housing 105. The front pipe 171 is disposed to be basically located generally right below the central axis of the body 103 as viewed from the vertical direction, but as shown in FIG. 18, in the intermediate region in the longitudinal direction, the front pipe 171 is appropriately bent to extend along one side in order to prevent the pipe 171 from interfering with the output shaft 112 of the driving motor 111 and the intermediate shaft of the power transmitting mechanism 117. As shown in FIG. 17, the front pipe 171 is mounted by being held from below and above by the mating surfaces of the motor housing 105 and the gear housing cover 107A. Further, as shown in FIG. 18, a pair of mounting protrusions 171*a* are integrally formed on the outer surface of the front end portion of the front pipe 171 and protrude horizontally in a radial direction of the pipe. The protrusions 171*a* are fastened to a pipe seat 105*b* (see FIG. 12) formed on the motor housing 105, by screws (not shown). Further, a circumferential groove 171*b* (see FIG. 18) is formed in at least a lower surface of a rear end portion of the front pipe 171 and engaged with the upper end edge of the motor housing 105. Thus, the front pipe 171 is mounted in such a manner as to be locked against movement in all directions with respect to the front body part 103F when the components of the front body part 103F are assembled together (see FIG. 11).

Figure 19:
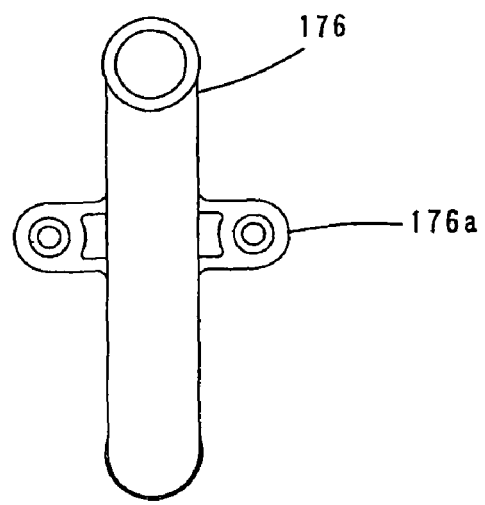
FIG. 19 is a view as viewed from the direction of the arrow J in FIG. 17.

The rear pipe 176 is generally Z-shaped as viewed from the side as shown in FIG. 17, and has a pair of mounting protrusions 176*a* integrally formed on the outer surface of its vertically extending intermediate region and protruding horizontally in its radial direction as shown in FIG. 19. The rear pipe 176 is placed with respect to the rear body part 103R such that one end (front end) of the rear pipe 176 in the extending direction protrudes forward and the other end (rear end) protrudes rearward through the rear wall of the rear body part 103R. Then the rear pipe 176 is fixedly mounted to a pipe seat 103Ra (see FIG. 17) formed on the rear body part 103R, by screws (not shown).

Further, the dust discharge port 178 integrally formed with the handgrip 109 has a front connection port 178*a* to which the rear protruding part of the rear pipe 176 can be connected, and a rear connection port 178*b* to which the dust collecting hose 175 of the dust collector can be connected.

As described above, the dust transfer passage 153 disposed within the body 103 has a split structure in the longitudinal direction, corresponding to the split structure of the body 103. When the front body part 103F and the rear body part 103R are assembled together, the front end of the rear pipe 176 is connected by inserting into the rear end opening of the front pipe 171. Further, when the handgrip 109 is mounted to the rear body part 103R, the rear end of the rear pipe 176 is connected by inserting into the front connection port 178*b* of the dust discharge port 178. Thus, the dust transfer passage 153 is formed. In this manner, the dust transfer passage 153 is formed by assembling the body 103 and mounting the handgrip 109. Therefore, compared with a construction in which the dust transfer passage 153 is mounted after completion of assembly of the body 103, ease of mounting the dust transfer passage 153 is improved. Further, the dust transfer passage 153 can be easily repaired when clogged with dust.

Further, as shown in FIG. 17, the connecting passage 167 which is provided on the cap 161 in order to connect the bellows 165 of the dust suction unit 161 to the front pipe 171 of the dust transfer passage 153 is separately formed from the cap 161. The connecting passage 167 is formed by a pipe of which one end (front end) can be detachably connected to a connection port 161c of the cap 161 and the other end (rear end) can be detachably connected to the front end opening of the front pipe 171. Further, the connecting passage 167 has a bellows-like portion in its intermediate region in the extending direction and is thus provided with flexibility, so that it can be easily positioned when connected to the connection port 161c of the cap 161 and the front end opening of the front pipe 171.

As described above, the connecting passage 167 can be removed not only from the dust transfer passage 153 but from the cap 161. Therefore, by removing the connecting passage 167 from the connection port 161c of the cap 161 and directly connecting the dust collecting hose 175 of the dust collector to the connection port 161c, dust can also be collected without using the dust transfer passage 153 extending within the body 103. In this case, resistance of air flow is reduced due to nonuse of the dust transfer passage 153, so that dust can be sucked with stronger suction force. In this case, preferably, the front end opening of the front pipe 171 which is a dust suction port of the dust transfer passage 153 and the rear connection port 178b of the dust discharge port 178 are closed by plugs.

(Fourth Representative Embodiment)

Figure 20:
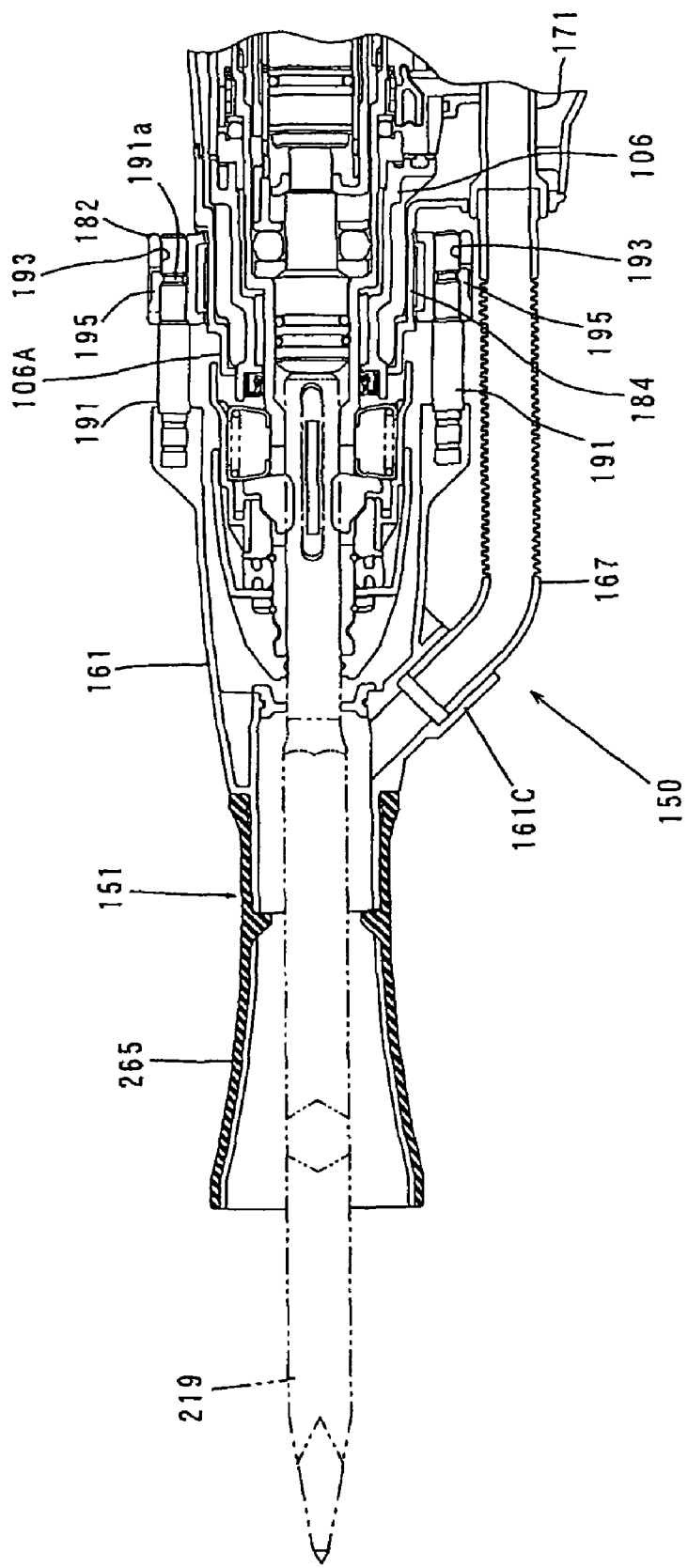
FIG. 20 is a view illustrating a dust suction device according to a fourth embodiment of the invention.

A fourth representative embodiment of the invention is now described with reference to FIG. 20. The dust suction device 150 of this embodiment is provided as a change from one for drilling operation to one for hammering operation. The dust suction device 150 can be applied to a hammer in which a hammer bit performs only linear movement and also to a hammer drill which can switch between hammer mode in which the hammer bit performs only linear movement and hammer drill mode in which it performs linear movement and rotation. As well known, the hammer has the same construction as the hammer drill, except that it does not have a power transmitting mechanism for rotating the hammer bit.

This embodiment has the same construction as the third representative embodiment, except that the bellows 165 of the dust suction unit 151 according g to the third representative embodiment is changed to an inextensible dust suction sleeve 265. Hammering operation is preferably performed while visually checking the position of the tip end of the tool bit. Therefore, as shown in FIG. 20, the dust suction unit 151 of the dust suction device 150 is configured such that a tip end portion of a hammer bit (bull point) 219 for hammering operation protrudes a predetermined length through the end of the dust suction sleeve 265. Further, the dust suction sleeve 265 is conically shaped (trumpet-shaped) such that its inside diameter increases toward the tip end. Specifically, the opening area of the dust suction sleeve 265 is maximized at the tip end region. With such configuration, the dust suction sleeve 265 can be avoided from interfering with the workpiece during hammering operation and thus with the hammering operation, and at the same time, the ease with which dust can be collected (caught) by the dust suction sleeve 265 can be improved. The construction of the dust suction device 150 for hammering operation is identical to the dust suction device 150 for drilling operation which is described in the third embodiment except for the above-described point. Therefore, all the components of the dust suction device 150 for hammering operation other than the above-described construction are given like numerals as the dust suction device 150 for drilling operation and are not described or briefly described.

The dust suction device 150 constructed as described above is applied in hammering operation. Dust generated during hammering operation can be collected into the dust suction Sleeve 265 and forced to be sucked by a dust collector. Further, the dust sucking and collecting operation through the dust suction sleeve 265 can be performed without need of interrupting the hammering operation, so that workability can also be improved.

In order to apply the dust suction device 150 designed for drilling operation and the dust suction device 150 designed for hammering operation to the hammer drill 101, the bellows 165 or the dust suction sleeve 265 can be mounted to the hammer drill 101 by replacement, according to the operation mode, or specifically, according to whether it is driven in hammer mode or it is driven in hammer drill mode or drill mode. In this case, the bellows 165 or the dust suction sleeve 265 which is configured to be suitable for the operation can be properly used to collect dust, so that the dust collecting operation can be efficiently performed. Further, components other than the bellows 165 or the dust suction sleeve 265 can be rationally shared.

Further, in the above-described first to third representative embodiments, the hammer bit 119 is entirely covered with the bellows 165 of the dust suction unit 151 and the internal space of the bellows 165 is designed as the dust passage 166. It may however be constructed, for example, such that only the tip end portion of the hammer bit 119 is covered and dust sucked through the dust suction port is transferred into the pipe 171 through the connecting passage.

Further, in the above embodiments, the hammer drill 101 is described in which the hammer bit 119 performs hammering movement in the axial direction and drilling movement in the circumferential direction, but, naturally, the invention can also be applied to a hammer in which the hammer bit 119 performs only the hammering movement in the axial direction.

Further, having regard to the above-described, following features can be provided.

"The dust suction part may have at least two mounting rods extending in the axial direction of the tool bit and the mounting rods may be removably inserted into mounting holes formed in the tool body, so that the dust suction part is mounted to the tool body."

"An unlocking sleeve for tool bit replacement may be disposed in the tip end region of the tool body and can be slid by a user in the axial direction of the tool bit, and each of the mounting rods may extend in a direction opposite to the tool bit, passing the outside of the unlocking sleeve, and its extending end is inserted into the associated mounting hole of the tool body."

"The dust transfer passage may include a hard pipe and a flexible hose connected to the pipe."

"A through hole may be formed through the side handle in the axial direction of the tool bit, and the mounting rod of the dust suction part may be removably inserted into the mounting hole of the tool body through the through hole."

DESCRIPTION OF NUMERALS 101 hammer drill (power tool)
103 body
103F front body part
103R rear body part
103Ra pipe seat
105 motor housing
105a tubular cover
105b pipe seat
106 barrel
106A barrel cover
106a mounting hole 106b overhang
107 gear housing
107A gear housing cover
109 handgrip (handle)
109a trigger
111 driving motor
112 output shaft
113 motion converting mechanism
115 striking mechanism
117 power transmitting mechanism
119 hammer bit (tool bit)
121 grip part
122 upper connecting part
123 lower connecting part
123a tubular cover
124 pivot
125 coil spring
126 cord guard
129 piston
131 controller
137 tool holder
137a bit holding hole
138 lock claw
139 unlocking sleeve
141 cylinder
141a air chamber
143 striker
145 impact bolt
150 dust suction device
151 dust suction unit (dust suction part)
153 dust transfer passage
161 cap
161a rear open end
161b front open end
161c connection port
163 mounting rod
164 O-ring
165 bellows
165a dust suction port
165b connection port
166 passage
167 connecting passage
171 pipe, front pipe
171a mounting protrusion
171b groove
172 suction hole (opening)
172a bulged projection
173 hose
174 dust discharge port
175 dust collecting hose
176 rear pipe
176a mounting protrusion
178 dust discharge port
178a front connection port
178b rear connection port
181 side grip (side handle)
182 grip body
182a fastening band
182b threaded operation rod
183 grip part
184 grip mounting part
185 through hole
187 side plate
187a engagement surface
188 nut
191 pole
191a engagement groove
193 engagement hole
195 engagement member
195a engagement protrusion
219 hammer bit
265 dust suction sleeve

What we claim is:

1. A power tool comprising:
a motor having a rotational axis,
a tool body that houses the motor, wherein a tool bit is coupled to a tip end region of the tool body and driven by the motor to perform a predetermined operation,
a dust suction part through which dust generated during operation by the tool bit is sucked, the dust suction part covering at least a part of the tool bit,
a dust transfer passage through which the dust sucked into the dust suction part is transferred, the dust transfer passage being disposed within the tool body, and
a dust discharge port through which the dust transferred through the dust transfer passage is discharged to the outside, wherein the dust discharge port is disposed laterally on one side of the rotational axis of the motor and the tool bit is disposed laterally on an opposite side of the rotation axis of the motor.

2. The power tool as defined in claim 1,
wherein the motor is disposed such that an extension of the rotational axis of the motor runs in a direction transverse to an axial direction of the tool bit, and
in a horizontal position of the tool body in which the axial direction of the tool bit coincides with a horizontal direction, a portion of the dust transfer passage extends in a direction transverse to an axial direction of an output shaft of the motor above the output shaft within the tool body.

3. The power tool as defined in claim 1, further comprising a handle having a grip part to be held by a user, the grip part extending in a direction transverse to an axial direction of the tool bit, both ends of the handle in the extending direction of the grip part being connected to the tool body by a connection, wherein the dust discharge port is formed in one of the connections of the handle to the tool body which is remote from an axis of the tool bit.

4. The power tool as defined in claim 1, further comprising an electric cord that supplies power to the motor, wherein the dust discharge port is disposed adjacent to the electric cord.

5. The power tool as defined in claim 1, wherein the dust suction part entirely covers the tool bit and has a cap-like shape having an open end formed as a dust suction port on the tool bit side, and on a side opposite to the dust suction port, the dust suction part has a connecting passage through which the dust sucked into a space between the dust suction part and the tool bit through the dust suction port is transferred to the dust transfer passage.

6. The power tool as defined in claim 5, further comprising a side handle extending in a direction transverse to an axial direction of the tool bit, wherein the dust suction part is mountable to the tool body with the side handle mounted to the tool body.

7. The power tool as defined in claim 5, wherein replacement of the tool bit can be made with the dust suction part mounted to the tip end region of tool body.

8. The power tool as defined in claim 1, wherein the dust suction part includes an expandable and contractable movable region having a tubular bellows to cover the tool bit and a fixed region mounted to the tip end region of the tool body, the movable region being removable from the fixed region so that the movable region is replaced.

9. The power tool as defined in claim 1, wherein openings are formed in the dust transfer passage to provide communication between the dust transfer passage and an internal space of the tool body.

10. The power tool as defined in claim 9, further comprising a driving mechanism that is driven by the motor and causes the tool bit to perform at least linear movement in the axial direction,
- wherein the tool body has an inner housing that houses the driving mechanism and an outer housing that covers the inner housing, and
- the dust transfer passage is disposed in an internal space between the inner housing and the outer housing.

11. The power tool as defined in claim 1, wherein
- the tool body is formed by a plurality of tool body components, and
- the dust transfer passage has a correspondingly configured split structure, so that a single dust transfer passage is formed when the plurality of tool body components are assembled into the tool body.

12. The power tool as defined in claim 1, wherein
- the dust suction part has at least two mounting rods extending in an axial direction of the tool bit, and
- the at least two mounting rods are removably inserted into mounting holes formed in the tool body, so that the dust suction part is mounted to the tool body by the at least two mounting rods.

13. The power tool as defined in claim 12, further comprising an unlocking sleeve for tool bit replacement, wherein
- the unlocking sleeve is disposed in the tip end region of the tool body and is slidable by a user in the axial direction of the tool bit, and
- each of the at least two mounting rods extends in a direction opposite to the tool bit, passing the outside of the unlocking sleeve and an extending end of each of the at least two mounting rods is inserted into an associated mounting hole of the tool body.

14. The power tool as defined in claim 1, wherein the dust transfer passage includes a hard pipe and a flexible hose connected to the hard pipe.

15. The power tool as defined in claim 1, further comprising a side handle extending in a direction transverse to an axial direction of the tool bit, wherein a through hole is formed through the side handle in the axial direction of the tool bit and a mounting rod of the dust suction part is removably inserted into a mounting hole of the tool body through the through hole.

* * * * *